US012544171B2

(12) United States Patent
Reid et al.

(10) Patent No.: US 12,544,171 B2
(45) Date of Patent: Feb. 10, 2026

(54) MEDICAL INSTRUMENT HAVING SINGLE INPUT FOR DRIVING MULTIPLE CABLES

(71) Applicant: Intuitive Surgical Operations, Inc., Sunnyvale, CA (US)

(72) Inventors: Robert C. Reid, Palm Beach Gardens, FL (US); Justin D. Krom, Southington, CT (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 471 days.

(21) Appl. No.: 17/922,537

(22) PCT Filed: Apr. 29, 2021

(86) PCT No.: PCT/US2021/029889
§ 371 (c)(1),
(2) Date: Oct. 31, 2022

(87) PCT Pub. No.: WO2021/225863
PCT Pub. Date: Nov. 11, 2021

(65) Prior Publication Data
US 2023/0172680 A1   Jun. 8, 2023

Related U.S. Application Data

(60) Provisional application No. 63/019,529, filed on May 4, 2020.

(51) Int. Cl.
*A61B 34/30* (2016.01)
*A61B 34/00* (2016.01)
*A61B 34/35* (2016.01)
(52) U.S. Cl.
CPC ........ *A61B 34/71* (2016.02); *A61B 2034/302* (2016.02); *A61B 2034/306* (2016.02); *A61B 34/35* (2016.02); *A61B 2034/715* (2016.02)

(58) Field of Classification Search
CPC ... A61B 34/71; A61B 34/35; A61B 2034/302; A61B 2034/306; A61B 2034/715; A61B 2034/305; A61B 34/30; A61B 17/29
See application file for complete search history.

(56) References Cited

U.S. PATENT DOCUMENTS 2,091,317 A   8/1937 Hill
4,751,821 A   6/1988 Birchard
(Continued)

FOREIGN PATENT DOCUMENTS

AU   2014208189 A1   4/2015
CN   104116547 A   10/2014
(Continued)

OTHER PUBLICATIONS

International Search Report and Written Opinion for Application No. PCT/US2021/029889, mailed Sep. 13, 2021, 25 pages.
(Continued)

*Primary Examiner* — Allen Porter
*Assistant Examiner* — Alisha J Sircar

(57) ABSTRACT

A medical instrument includes a shaft, a wrist, a mechanical structure, a first cable, and a second cable. The wrist is coupled to the distal end portion of the shaft. The mechanical structure is coupled to a proximal end portion of the shaft and includes a capstan assembly. The capstan assembly includes a first cable drum having a first radius and a second cable drum having a second, different radius. The first cable is routed along the shaft. A distal end portion of the first cable is coupled to the wrist and a proximal end portion of the first cable is wrapped about the first cable drum. The second cable is routed along the shaft. A distal end portion of the second cable is coupled to the wrist and a proximal end portion of the second cable is wrapped about the second cable drum.

18 Claims, 23 Drawing Sheets

(56) References Cited

U.S. PATENT DOCUMENTS

| | | |
|---|---|---|
| 5,207,691 A | 5/1993 | Nardella |
| 5,792,135 A | 8/1998 | Madhani et al. |
| 5,807,377 A | 9/1998 | Madhani et al. |
| 5,816,769 A | 10/1998 | Bauer et al. |
| 5,855,583 A | 1/1999 | Wang et al. |
| 5,876,325 A | 3/1999 | Mizuno et al. |
| 6,197,017 B1 | 3/2001 | Brock et al. |
| 6,331,181 B1 | 12/2001 | Tierney et al. |
| 6,394,998 B1 | 5/2002 | Wallace et al. |
| 6,817,974 B2 | 11/2004 | Cooper et al. |
| 6,949,106 B2 | 9/2005 | Brock et al. |
| 6,994,708 B2 | 2/2006 | Manzo |
| 7,090,683 B2 | 8/2006 | Brock et al. |
| 7,169,141 B2 | 1/2007 | Brock et al. |
| 7,214,230 B2 | 5/2007 | Brock et al. |
| 7,331,967 B2 | 2/2008 | Lee et al. |
| 7,371,210 B2 | 5/2008 | Brock et al. |
| 7,608,083 B2 | 10/2009 | Lee et al. |
| 7,935,130 B2 | 5/2011 | Williams |
| 8,123,764 B2 | 2/2012 | Meade et al. |
| 8,142,421 B2 | 3/2012 | Cooper et al. |
| 8,224,484 B2 | 7/2012 | Swarup et al. |
| 8,444,631 B2 | 5/2013 | Yeung et al. |
| 8,479,969 B2 | 7/2013 | Shelton, IV |
| 8,506,555 B2 | 8/2013 | Ruiz Morales |
| 8,551,115 B2 | 10/2013 | Steger et al. |
| 8,573,465 B2 | 11/2013 | Shelton, IV |
| 8,597,280 B2 | 12/2013 | Cooper et al. |
| 8,602,288 B2 | 12/2013 | Shelton, IV et al. |
| 8,771,270 B2 | 7/2014 | Burbank |
| 8,800,838 B2 | 8/2014 | Shelton, IV |
| 8,808,166 B2 | 8/2014 | Hosaka |
| 8,992,565 B2 | 3/2015 | Brisson et al. |
| 9,002,518 B2 * | 4/2015 | Manzo .................. A61B 90/98 901/19 |
| 9,028,494 B2 | 5/2015 | Shelton, IV et al. |
| 9,078,684 B2 | 7/2015 | Williams |
| 9,204,923 B2 | 12/2015 | Manzo et al. |
| 9,232,979 B2 | 1/2016 | Parihar et al. |
| 9,259,274 B2 | 2/2016 | Prisco |
| 9,259,275 B2 | 2/2016 | Burbank |
| 9,339,341 B2 | 5/2016 | Cooper |
| 9,339,342 B2 | 5/2016 | Prisco et al. |
| 9,524,022 B2 | 12/2016 | Nakayama |
| 9,533,122 B2 | 1/2017 | Weitzner et al. |
| 9,664,262 B2 | 5/2017 | Donlon et al. |
| 9,737,373 B2 | 8/2017 | Schuh |
| 9,750,578 B2 | 9/2017 | Alden et al. |
| 9,839,439 B2 | 12/2017 | Cooper et al. |
| 9,931,106 B2 | 4/2018 | Au et al. |
| 9,962,228 B2 | 5/2018 | Schuh et al. |
| 9,993,313 B2 | 6/2018 | Schuh et al. |
| 10,076,348 B2 | 9/2018 | Anderson et al. |
| 10,130,366 B2 | 11/2018 | Shelton, IV et al. |
| 10,219,874 B2 | 3/2019 | Yu et al. |
| 10,285,763 B2 | 5/2019 | Vale et al. |
| 10,357,321 B2 | 7/2019 | Donlon et al. |
| 10,470,830 B2 | 11/2019 | Hill et al. |
| 10,478,163 B2 | 11/2019 | Prisco et al. |
| 10,478,256 B2 | 11/2019 | Shelton, IV et al. |
| 10,524,870 B2 | 1/2020 | Saraliev et al. |
| 10,543,051 B2 | 1/2020 | Schena et al. |
| 10,550,918 B2 | 2/2020 | Cooper et al. |
| 10,595,949 B2 | 3/2020 | Donlon et al. |
| 10,624,709 B2 | 4/2020 | Remm |
| 10,682,141 B2 | 6/2020 | Moore et al. |
| 10,772,690 B2 | 9/2020 | Prisco |
| 10,779,898 B2 | 9/2020 | Hill et al. |
| 10,799,303 B2 * | 10/2020 | Cooper .................. A61B 34/30 |
| 10,806,530 B2 | 10/2020 | Liao et al. |
| 10,881,280 B2 | 1/2021 | Baez, Jr. |
| 10,932,868 B2 | 3/2021 | Solomon et al. |
| 10,980,556 B2 | 4/2021 | Anderson et al. |
| 11,013,566 B2 | 5/2021 | Diel et al. |
| 11,020,112 B2 | 6/2021 | Shelton, IV et al. |
| 11,045,270 B2 | 6/2021 | Shelton, IV et al. |
| 11,076,926 B2 | 8/2021 | Ragosta et al. |
| 11,207,145 B2 | 12/2021 | Lambrecht et al. |
| 11,241,290 B2 | 2/2022 | Waterbury et al. |
| 11,248,686 B2 | 2/2022 | Cooper et al. |
| 11,304,770 B2 | 4/2022 | Crews et al. |
| 2002/0111621 A1 | 8/2002 | Wallace et al. |
| 2002/0111635 A1 | 8/2002 | Jensen et al. |
| 2003/0068607 A1 | 4/2003 | Gregorio et al. |
| 2005/0042943 A1 | 2/2005 | Mocivnik et al. |
| 2005/0119527 A1 | 6/2005 | Banik et al. |
| 2006/0074415 A1 | 4/2006 | Scott et al. |
| 2006/0190034 A1 | 8/2006 | Nishizawa et al. |
| 2007/0043338 A1 | 2/2007 | Moll et al. |
| 2007/0119274 A1 | 5/2007 | Devengenzo et al. |
| 2007/0232858 A1 | 10/2007 | Macnamara et al. |
| 2008/0009838 A1 | 1/2008 | Schena et al. |
| 2008/0046122 A1 | 2/2008 | Manzo et al. |
| 2008/0065102 A1 | 3/2008 | Cooper |
| 2008/0065105 A1 | 3/2008 | Larkin et al. |
| 2008/0087871 A1 | 4/2008 | Schena et al. |
| 2008/0103491 A1 | 5/2008 | Omori et al. |
| 2008/0196533 A1 | 8/2008 | Bergamasco et al. |
| 2009/0088774 A1 | 4/2009 | Swarup et al. |
| 2009/0198272 A1 | 8/2009 | Kerver et al. |
| 2010/0170519 A1 | 7/2010 | Romo et al. |
| 2010/0175701 A1 | 7/2010 | Reis et al. |
| 2010/0198253 A1 | 8/2010 | Jinno et al. |
| 2010/0318101 A1 | 12/2010 | Choi et al. |
| 2011/0015650 A1 | 1/2011 | Choi et al. |
| 2011/0071543 A1 | 3/2011 | Prisco et al. |
| 2011/0118754 A1 | 5/2011 | Dachs, II et al. |
| 2011/0184241 A1 | 7/2011 | Zubiate et al. |
| 2011/0277775 A1 | 11/2011 | Holop et al. |
| 2011/0295269 A1 | 12/2011 | Swensgard et al. |
| 2011/0295270 A1 | 12/2011 | Giordano et al. |
| 2012/0046522 A1 | 2/2012 | Naito |
| 2012/0109186 A1 | 5/2012 | Parrott et al. |
| 2012/0123441 A1 | 5/2012 | Au et al. |
| 2012/0150192 A1 | 6/2012 | Dachs, II et al. |
| 2012/0239060 A1 | 9/2012 | Orban, III et al. |
| 2012/0289974 A1 | 11/2012 | Rogers et al. |
| 2012/0292367 A1 | 11/2012 | Morgan et al. |
| 2012/0298719 A1 | 11/2012 | Shelton, IV et al. |
| 2013/0046318 A1 | 2/2013 | Radgowski et al. |
| 2013/0123783 A1 | 5/2013 | Marczyk et al. |
| 2013/0144395 A1 | 6/2013 | Stefanchik et al. |
| 2014/0005662 A1 | 1/2014 | Shelton, IV |
| 2014/0005678 A1 | 1/2014 | Shelton, IV et al. |
| 2014/0005708 A1 | 1/2014 | Shelton, IV |
| 2014/0018821 A1 * | 1/2014 | Yeung .................. A61B 34/71 606/130 |
| 2014/0100558 A1 | 4/2014 | Schmitz et al. |
| 2014/0107665 A1 | 4/2014 | Shellenberger et al. |
| 2014/0114327 A1 | 4/2014 | Boudreaux et al. |
| 2014/0257333 A1 | 9/2014 | Blumenkranz |
| 2014/0276723 A1 | 9/2014 | Parihar et al. |
| 2014/0309625 A1 | 10/2014 | Okamoto et al. |
| 2015/0005786 A1 | 1/2015 | Burbank |
| 2015/0051034 A1 | 2/2015 | Cooper et al. |
| 2015/0150635 A1 | 6/2015 | Kilroy et al. |
| 2015/0157355 A1 | 6/2015 | Price et al. |
| 2016/0058443 A1 | 3/2016 | Yates et al. |
| 2016/0151115 A1 | 6/2016 | Karguth et al. |
| 2016/0157926 A1 | 6/2016 | Boudreaux |
| 2016/0184034 A1 | 6/2016 | Holop et al. |
| 2016/0296219 A1 | 10/2016 | Srivastava et al. |
| 2016/0338762 A1 | 11/2016 | Krastins et al. |
| 2016/0361049 A1 | 12/2016 | Dachs, II et al. |
| 2017/0007345 A1 | 1/2017 | Smith et al. |
| 2017/0120457 A1 | 5/2017 | Saraliev et al. |
| 2017/0165017 A1 | 6/2017 | Chaplin et al. |
| 2017/0172672 A1 | 6/2017 | Bailey et al. |
| 2017/0207467 A1 | 7/2017 | Shelton, IV et al. |
| 2017/0265865 A1 | 9/2017 | Burbank |
| 2018/0104011 A1 | 4/2018 | Kadokura et al. |
| 2018/0104012 A1 | 4/2018 | Wixey et al. |
| 2018/0126504 A1 | 5/2018 | Shelton, IV et al. |
| 2018/0214223 A1 | 8/2018 | Turner |

(56) References Cited

U.S. PATENT DOCUMENTS

| | | |
|---|---|---|
| 2018/0229021 A1 | 8/2018 | Donlon et al. |
| 2019/0038282 A1 | 2/2019 | Shelton, IV et al. |
| 2019/0099227 A1 | 4/2019 | Rockrohr |
| 2019/0117325 A1 | 4/2019 | Kishi |
| 2019/0125468 A1 | 5/2019 | Adams |
| 2019/0192137 A1 | 6/2019 | Shelton, IV et al. |
| 2019/0223960 A1 | 7/2019 | Chaplin et al. |
| 2019/0231451 A1 | 8/2019 | Lambrecht et al. |
| 2019/0231464 A1 | 8/2019 | Wixey et al. |
| 2019/0239877 A1 | 8/2019 | Ragosta et al. |
| 2019/0239965 A1 | 8/2019 | Abbott |
| 2019/0239967 A1 | 8/2019 | Ragosta et al. |
| 2019/0249759 A1 | 8/2019 | Abbott |
| 2019/0298323 A1 | 10/2019 | Lambrecht et al. |
| 2019/0307522 A1* | 10/2019 | Lambrecht ............ A61B 34/30 |
| 2019/0328467 A1* | 10/2019 | Waterbury ............ A61B 34/30 |
| 2019/0380800 A1 | 12/2019 | Jogasaki et al. |
| 2020/0093554 A1* | 3/2020 | Schuh ............ A61B 17/00234 |
| 2020/0138473 A1 | 5/2020 | Shelton, IV et al. |
| 2020/0197117 A1 | 6/2020 | Donlon et al. |
| 2020/0261168 A1 | 8/2020 | Anglese |
| 2020/0383738 A1 | 12/2020 | Abbott et al. |
| 2020/0383739 A1 | 12/2020 | Abbott et al. |
| 2021/0045819 A1 | 2/2021 | Castillo et al. |
| 2021/0093408 A1* | 4/2021 | Carey ................. A61B 90/50 |
| 2021/0169597 A1 | 6/2021 | Abbott et al. |
| 2021/0186544 A1 | 6/2021 | Anderson et al. |
| 2021/0220062 A1 | 7/2021 | Lambrecht et al. |
| 2021/0282793 A1 | 9/2021 | Anderson et al. |
| 2021/0322118 A1 | 10/2021 | Donlon et al. |
| 2021/0372508 A1 | 12/2021 | Abbott |
| 2021/0401523 A1* | 12/2021 | Suresh ................. A61B 34/71 |
| 2021/0401524 A1* | 12/2021 | Suresh ................. A61B 34/35 |
| 2022/0015847 A1 | 1/2022 | Kadokura |
| 2022/0039895 A1 | 2/2022 | Adams et al. |
| 2022/0087760 A1 | 3/2022 | Schuh et al. |
| 2022/0096067 A1 | 3/2022 | Beckman et al. |
| 2022/0096082 A1 | 3/2022 | Beckman et al. |
| 2022/0128133 A1 | 4/2022 | Cooper et al. |
| 2022/0192764 A1 | 6/2022 | Waterbury et al. |
| 2022/0249184 A1 | 8/2022 | Fischer et al. |
| 2023/0119001 A1 | 4/2023 | Abbott |
| 2023/0355328 A1 | 11/2023 | Lambrecht et al. |
| 2024/0156551 A1 | 5/2024 | Lambrecht et al. |
| 2024/0197423 A1 | 6/2024 | Ragosta et al. |
| 2024/0315792 A1 | 9/2024 | Lambrecht et al. |
| 2024/0382279 A1 | 11/2024 | Baldwin et al. |
| 2025/0000598 A1 | 1/2025 | Baldwin et al. |

FOREIGN PATENT DOCUMENTS

| | | | | |
|---|---|---|---|---|
| CN | 104799891 A | | 7/2015 | |
| CN | 109069138 A | | 12/2018 | |
| CN | 110269686 A | * | 9/2019 | ............ A61B 34/37 |
| CN | 110584787 A | | 12/2019 | |
| EP | 2362285 A2 | | 8/2011 | |
| EP | 2548529 A1 | | 1/2013 | |
| EP | 2783643 A1 | | 10/2014 | |
| EP | 3103374 A1 | | 12/2016 | |
| EP | 3195993 A1 | | 7/2017 | |
| FR | 3014678 A1 | | 6/2015 | |
| JP | H06114000 A | | 4/1994 | |
| JP | H10249777 A | | 9/1998 | |
| JP | 2003024336 A | | 1/2003 | |
| JP | 2004301275 A | | 10/2004 | |
| JP | 2005288590 A | | 10/2005 | |
| WO | WO-8910242 A1 | | 11/1989 | |
| WO | WO-9729690 A1 | | 8/1997 | |
| WO | WO-0030557 A1 | | 6/2000 | |
| WO | WO-2009079781 A1 | | 7/2009 | |
| WO | WO-2010009224 A1 | | 1/2010 | |
| WO | WO-2011060046 A2 | | 5/2011 | |
| WO | WO-2012068156 A2 | | 5/2012 | |
| WO | WO-2015142290 A1 | | 9/2015 | |
| WO | WO-2016161449 A1 | | 10/2016 | |
| WO | WO-2016172299 A1 | | 10/2016 | |
| WO | WO-2016189284 A1 | | 12/2016 | |
| WO | WO-2017064303 A1 | | 4/2017 | |
| WO | WO-2017188851 A1 | | 11/2017 | |
| WO | WO-2018013313 A1 | | 1/2018 | |
| WO | WO-2018049217 A1 | | 3/2018 | |
| WO | WO-2018069679 A1 | | 4/2018 | |
| WO | WO-2018179140 A1 | | 10/2018 | |
| WO | WO-2020102776 A1 | | 5/2020 | |
| WO | WO-2020102780 A1 | | 5/2020 | |
| WO | WO-2020252184 A1 | | 12/2020 | |
| WO | WO-2021155707 A1 | | 8/2021 | |
| WO | WO-2022132885 A1 | | 6/2022 | |
| WO | WO-2023055684 A2 | | 4/2023 | |
| WO | WO-2023177554 A1 | | 9/2023 | |

OTHER PUBLICATIONS

Invitation to pay additional fee received from the International Search Authority for Application No. PCT/US2021/029889, mailed Jul. 23, 2021, 18 pages.

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

Office Action for CN Application No. 2021800408998, mailed May 23, 2025, 41 pages.

\* cited by examiner

MEDICAL INSTRUMENT HAVING SINGLE INPUT FOR DRIVING MULTIPLE CABLES

RELATED APPLICATIONS

This patent application is a U.S. national stage filing under 35 U.S.C. § 371 of International Application No. PCT/US2021/029889 (filed Apr. 29, 2021), entitled "MEDICAL INSTRUMENT HAVING SINGLE INPUT FOR DRIVING MULTIPE CABLES," which claims priority to and the filing date benefit of U.S. Provisional Patent Application No. 63/019,529, filed May 4, 2020, entitled "MEDICAL INSTRUMENT HAVING SINGLE INPUT FOR DRIVING MULTIPE CABLES," each of which is incorporated by reference herein in its entirety.

BACKGROUND

The aspects described herein relate to medical devices, and more specifically to medical instruments used during minimally invasive surgery. More particularly, the embodiments described herein relate to devices that include mechanisms (e.g., capstans) for driving multiple cables with a single rotary input.

Known techniques for Minimally Invasive Surgery (MIS) employ instruments that can be either manually controlled or controlled via computer-assisted teleoperation so as to manipulate or otherwise move with reference to tissue inside a patient's body. Many known MIS instruments include a therapeutic or diagnostic end effector (e.g., forceps, a cutting tool, a cauterizing tool, a stapler, a needle driver, or a biopsy tool) mounted on an optional wrist mechanism at the distal end of a shaft. During an MIS procedure, the end effector, wrist mechanism, and the distal end of the shaft are inserted into a small incision or a natural orifice of a patient to position the end effector at a work site within the patient's body.

In known MIS instruments, end effector motion inside the patient is typically accomplished in two ways. First, the instrument as a whole may move in one or more mechanical degrees of freedom (DOFs)(e.g., along x, y, and z Cartesian axes) to translate the end effector at the work site. Second, the optional wrist mechanism includes one or more mechanical DOFs to enable the end effector to rotate (e.g., around x, y, and z Cartesian axes, sometimes arbitrarily called pitch, yaw, and insertion axes) with reference to the main body of the instrument. For example, known wrist mechanisms are often able to change the pitch and yaw of the end effector with reference to the instrument shaft. A wrist may optionally provide a roll DOF for the end effector, or the roll DOF may optionally be implemented by rolling the instrument shaft. An end effector may optionally have additional mechanical DOFs, such as jaw element grip motion or knife blade motion. In some instances, wrist and end effector mechanical DOFs may be combined. For example, U.S. Pat. No. 5,792,135 (filed May 16, 1997) discloses a mechanism in which wrist yaw and end effector grip DOFs are combined.

To enable the desired movement of the wrist mechanism and end effector, known instruments often include tension elements (e.g., cables) that extend from the distal wrist mechanism and end effector, through the shaft of the instrument, to a proximal mechanical structure configured to move the tension elements so as to operate the wrist mechanism and end effector. For computer-assisted teleoperated systems, the mechanical structure is typically motor driven and is operably coupled to a processing system to provide a user interface for a clinical user (e.g., a surgeon) to control the instrument. Known mechanical structures in a teleoperated medical instrument include one or more capstans, each being coupled to a cable such that when the capstan is rotated by a motor, the cable is moved to operate the wrist mechanism or end effector. Typically, each capstan is attached to two cables (or the two ends of a single cable loop) so that when the capstan rotates, one side of the capstan pays out cable while the other side of the capstan pulls in an equal length of cable. With this architecture, three degrees of freedom use a total of six cables extending from the wrist mechanism along the length of the instrument shaft to the mechanical structure of the instrument. For example, a wrist mechanism can be operably coupled to three capstans for rotations about a pitch axis, a yaw axis, or a grip axis. Efficient implementation of the wrist mechanism and the mechanical structure presents a complex design problem, however, because the cables must be carefully routed to maintain stability of the wrist mechanism throughout its range of motion and to minimize the interactions (or coupling effects) of one wrist rotation axis upon another.

For some known instruments, it is desirable that the wrist mechanism be capable of angular displacement about an axis (e.g., an arbitrarily designated pitch axis) by more than 90 degrees. The concept of the wrist mechanism bending back upon itself by more than 90 degrees is referred to as "retroflex" motion. To accomplish this retroflex motion, some known wrist mechanisms include multiple links that are pivotably coupled together in series to rotate with reference to each other about one or more axes between the links. For example, a wrist mechanism having two or more pairs of links, with each pair rotating about an axis (e.g., two or more parallel pitch axes), can produce retroflex motion when each pair of links rotates by more than 45 degrees about its associated axis.

But, multiple pairs of links increase the complexity of the mechanical structure to operate the wrist mechanism. Specifically, such wrist mechanisms with additional moving elements require additional cables in the wrist mechanism, shaft, and the mechanical structure that moves the cables. The inclusion of additional cables competes for the limited space that exists because of the mechanical structure and overall instrument size restrictions required by MIS applications, or by the design architecture of an existing computer-assisted teleoperated surgical system (e.g., limited available drive inputs). For example, the mechanical structure may allow for only a limited number of capstans (or drive inputs for moving associated capstans) for moving the cables. Thus, adding additional cables to facilitate the desired performance of the wrist mechanism may not be possible within a specific mechanical structure and within specific design constraints of an instrument used in a computer-assisted telesurgical system.

Thus, a need exists for improved minimally invasive surgical instruments, including improved mechanical structures to enable the inclusion of additional cables for operating a wrist mechanism, reduce costs of the instrument, and to reduce manufacturing cost by reducing the number of parts required. A need also exists for improved minimally invasive surgical instruments that can provide improved control of the movement of the wrist mechanism, especially retroflex motion.

SUMMARY

This summary introduces certain aspects of the embodiments described herein to provide a basic understanding.

This summary is not an extensive overview of the inventive subject matter, and it is not intended to identify key or critical elements or to delineate the scope of the inventive subject matter. In some embodiments, a medical instrument includes an instrument shaft having a distal end portion and a proximal end portion, a wrist, a mechanical structure, a first cable, and a second cable. The wrist is coupled to the distal end portion of the instrument shaft. The mechanical structure is coupled to the proximal end portion of the instrument shaft and includes a capstan assembly. The capstan assembly includes a first cable drum having a first radius and a second cable drum having a second radius that is different than the first radius. The first cable includes a proximal end portion and a distal end portion and is routed along the instrument shaft. The distal end portion of the first cable is coupled to the wrist and the proximal end portion of the first cable is wrapped about the first cable drum. The second cable includes a proximal end portion and a distal end portion and is routed along the instrument shaft. The distal end portion of the second cable is coupled to the wrist and the proximal end portion of the second cable is wrapped about the second cable drum.

In some embodiments, the capstan assembly includes an input disc and defines a rotation axis. The input disc is configured to be driven by an actuator to rotate the capstan assembly about the rotation axis. The rotation of the capstan assembly about the rotation axis moves the first cable at a first speed proportional to the first radius and the second cable at a second speed proportional to the second radius. In some embodiments, rotation of the capstan assembly about the rotation axis moves the first cable and the second cable in the same direction to actuate the wrist. In other embodiments, rotation of the capstan assembly about the rotation axis moves the first cable in a first direction and the second cable in a second direction opposite the first direction.

In some embodiments, the medical instrument includes a third cable and a fourth cable. The third cable includes a proximal end portion and a distal end portion and is routed along the instrument shaft. The distal end portion of the third cable is coupled to the wrist and the proximal end portion of the third cable is wrapped about the first cable drum. The fourth cable includes a proximal end portion and a distal end portion and is routed along the instrument shaft. The distal end portion of the fourth cable is coupled to the wrist and the proximal end portion of the fourth cable is wrapped about the second cable drum. In some embodiments, the capstan assembly includes an input disc and defines a rotation axis. The input disc is configured to be driven by an actuator to rotate the capstan assembly about the rotation axis. Rotation of the capstan assembly about the rotation axis moves the first cable and the second cable in a first direction to actuate the wrist. Rotation of the capstan assembly about the rotation axis moves the third cable and the fourth cable in a second, opposite direction to actuate the wrist. In some embodiments, the capstan assembly includes a capstan shaft and the input disc being is coupled to rotate the capstan shaft. The first cable drum includes a first wrap member and a second wrap member. The first wrap member is coupled to the capstan shaft by a first clamp, and the proximal end portion of the first cable is wrapped about the first wrap member in the first direction. The second wrap member is coupled to the capstan shaft by a second clamp, and the proximal end portion of the third cable is wrapped about the second wrap member in the second direction.

In some embodiments, the wrist includes a first link and a second link, and defines a first axis and a second axis. The first link is rotatable relative to the instrument shaft about the first axis and the distal end portion of the first cable is coupled to the first link. The second link is rotatable relative to the instrument shaft about the second axis and the distal end portion of the second cable is routed through the first link and coupled to the second link. In some embodiments, the first link is coupled to the second link by one or more intermediate links and the first axis is parallel to the second axis.

In some embodiments, a medical instrument includes an instrument shaft having a distal end portion and a proximal end portion, a wrist, a mechanical structure, a first cable, and a second cable. The wrist is coupled to the distal end portion of the instrument shaft. The mechanical structure is coupled to the proximal end portion of the instrument shaft and includes a capstan assembly. The capstan assembly includes a first drive member and a second drive member. The first cable includes a proximal end portion and a distal end portion and is routed along the instrument shaft. The distal end portion of the first cable is coupled to the wrist and the proximal end portion of the first cable is operatively coupled to the first drive member such that rotation of the capstan shaft moves the proximal end portion of the first cable at a first speed. The second cable includes a proximal end portion and a distal end portion and is routed along the instrument shaft. The distal end portion of the second cable is coupled to the wrist and the proximal end portion of the second cable is operatively coupled to the second drive member such that rotation of the capstan shaft moves the proximal end portion of the second cable at a second speed different than the first speed. In some embodiments, the capstan shaft, the first drive member, and the second drive member are concentric. In other embodiments, either or both of the first drive member and the second drive member can be nonconcentric to the capstan shaft.

In some embodiments, the first drive member is a first cable drum coupled to the capstan shaft and the proximal end portion of the first cable is wrapped about the first cable drum. In some embodiments, the second drive member is a second cable drum coupled to the capstan shaft and the proximal end portion of the second cable is wrapped about the second cable drum. In some embodiments, the second drive member is a drive gear coupled to the capstan shaft. The mechanical structure further includes a transfer member having a driven gear portion engaged with the drive gear. The proximal end portion of the second cable is coupled to the transfer member. In some embodiments, the capstan shaft defines a first rotation axis, and the first cable drum and the drive gear member are concentric with the first rotation axis. The transfer member defines a second rotation axis that is nonconcentric to the first rotation axis. In some embodiments, the driven gear portion of the transfer member is a sector gear.

In some embodiments, the medical instrument includes a third cable and a fourth cable. The third cable includes a proximal end portion and a distal end portion and is routed along the instrument shaft. The distal end portion of the third cable is coupled to the wrist and the proximal end portion of the third cable is operatively coupled to the first drive member. The fourth cable includes a proximal end portion and a distal end portion and is routed along the instrument shaft. The distal end portion of the fourth cable is coupled to the wrist and the proximal end portion of the fourth cable is operatively coupled to the second drive member. In some embodiments, rotation of the capstan assembly about the rotation axis moves the first cable and the second cable in a first direction to actuate the wrist. Rotation of the capstan assembly about the rotation axis moves the third cable and the fourth cable in a second, opposite direction to actuate the wrist.

In some embodiments, a medical instrument includes an instrument shaft having a distal end portion and a proximal end portion, a wrist, a first cable, and a second cable. The wrist is coupled to the distal end portion of the instrument shaft. The first cable includes a proximal end portion and a distal end portion and is routed along the instrument shaft. The distal end portion of the first cable is coupled to the wrist. The second cable includes a proximal end portion and a distal end portion and is routed along the instrument shaft. The distal end portion of the second cable is coupled to the wrist. The medical instrument further includes a means for moving the proximal end portion of the first cable and the proximal end portion of the second cable to actuate the wrist based on a single input such that the proximal end portion of the first cable is moved at a first speed and the proximal end portion of the second cable is moved at a second speed different than the first speed.

In some embodiments, the means for moving comprises a capstan shaft, a first cable drum, and a second cable drum. The first cable drum and the second cable drum are each coupled to the capstan shaft. The proximal end portion of the first cable is wrapped about the first cable drum and the proximal end portion of the second cable is wrapped about the second cable drum. In some embodiments, the first cable drum defines a first radius and the second cable drum defines a second radius that is different from the first radius.

In some embodiments, the means for moving comprises a capstan shaft, a cable drum, a drive gear, and a transfer member. The cable drum is coupled to the capstan shaft and the proximal end portion of the first cable is wrapped about the first cable drum. The drive gear is coupled to the capstan shaft and is engaged with the transfer member. The proximal end portion of the second cable is coupled to the transfer member.

In some embodiments, a medical instrument includes a distal first movable component, a distal second movable component, a first tension member, a second tension member, a proximal rotatable capstan, a first drive member coupled to the capstan, and a second drive member coupled to the capstan. The first drive member includes a first wrap region, and the second drive member includes a second wrap region. The first tension member extends from the first movable component to wrap at least partially around the first drive member at the first wrap region. The second tension member extends from the second movable component to wrap at least partially around the second drive member at the second wrap region. The first drive member has a first radius of rotation at a location where the first tension member wraps on and off the first wrap region. The second drive member has a second radius of rotation at a location where the second tension member wraps on and off the second wrap region. The second radius of rotation is different from the first radius of rotation.

In some embodiments, the medical instrument includes a third tension member, a fourth tension member, a third drive member coupled to the capstan, and a fourth drive member drive member coupled to the capstan. The third drive member includes a third wrap region, and the fourth drive member comprises a fourth wrap region. The third tension member extends from the first movable component to wrap at least partially around the third drive member at the third wrap region. The fourth tension member extends from the second movable component to wrap at least partially around the fourth drive member at the fourth wrap region. The third drive member has the first radius of rotation at a location where the third tension member wraps on and off at the third wrap region, and the fourth drive member has the second radius at a location where the fourth tension member wraps on and off the fourth wrap region.

In some embodiments, the tension members are cables. In some embodiments, the medical instrument includes a distal wrist and a distal end effector coupled to the wrist. The first movable component and the second movable component form at least a portion of the wrist (e.g., the first movable component and the second movable component are links of the wrist). The medical instrument defines a first longitudinal orientation, and the end effector defines a second longitudinal orientation. Rotation of the capstan moves the end effector from a first state in which the second longitudinal orientation is aligned with the first longitudinal orientation to a second state in which the second longitudinal orientation is retroflexed with reference to the first longitudinal orientation.

In some embodiments, a medical instrument includes proximal means for moving a first tension member a first distance and a second tension member a second distance as a single capstan rotates. The medical instrument includes distal first movable means coupled to the first tension member. The medical instrument includes distal second movable means coupled to the second tension member.

In some embodiments, a method of operating a medical instrument includes moving a distal first movable component and a distal second movable component by rotating a proximal single capstan to move a first tension member coupled to the first movable component by a first distance and to move a second tension member coupled to the second movable component a second distance different from the first distance.

In some embodiments, a medical instrument includes an instrument shaft having a distal end portion and a proximal end portion, a wrist, a mechanical structure, a first tension member, a second tension member, a third tension member, and a fourth tension member. The wrist is coupled to the distal end portion of the instrument shaft. The mechanical structure is coupled to the proximal end portion of the instrument shaft and includes a capstan assembly. The capstan assembly includes a first drive member, a second drive member, third drive member, and a fourth drive member. The first tension member includes a proximal end portion and a distal end portion and is routed along the instrument shaft. The distal end portion of the first tension member is coupled to the wrist and the proximal end portion of the first tension member is operatively coupled to the first drive member. The second tension member includes a proximal end portion and a distal end portion and is routed along the instrument shaft. The distal end portion of the second tension member is coupled to the wrist and the proximal end portion of the second tension member is operatively coupled to the second drive member. The third tension member includes a proximal end portion and a distal end portion and is routed along the instrument shaft. The distal end portion of the third tension member is coupled to the wrist and the proximal end portion of the third tension member is operatively coupled to the third drive member. The fourth tension member includes a proximal end portion and a distal end portion and is routed along the instrument shaft. The distal end portion of the fourth tension member is coupled to the wrist and the proximal end portion of the fourth tension member is operatively coupled to the fourth drive member.

Other medical devices, related components, medical device systems, and/or methods according to embodiments will be or become apparent to one with skill in the art upon review of the following drawings and detailed description. It is intended that all such additional medical devices, related components, medical device systems, and/or methods included within this description be within the scope of this disclosure.

DETAILED DESCRIPTION

Figure 1:
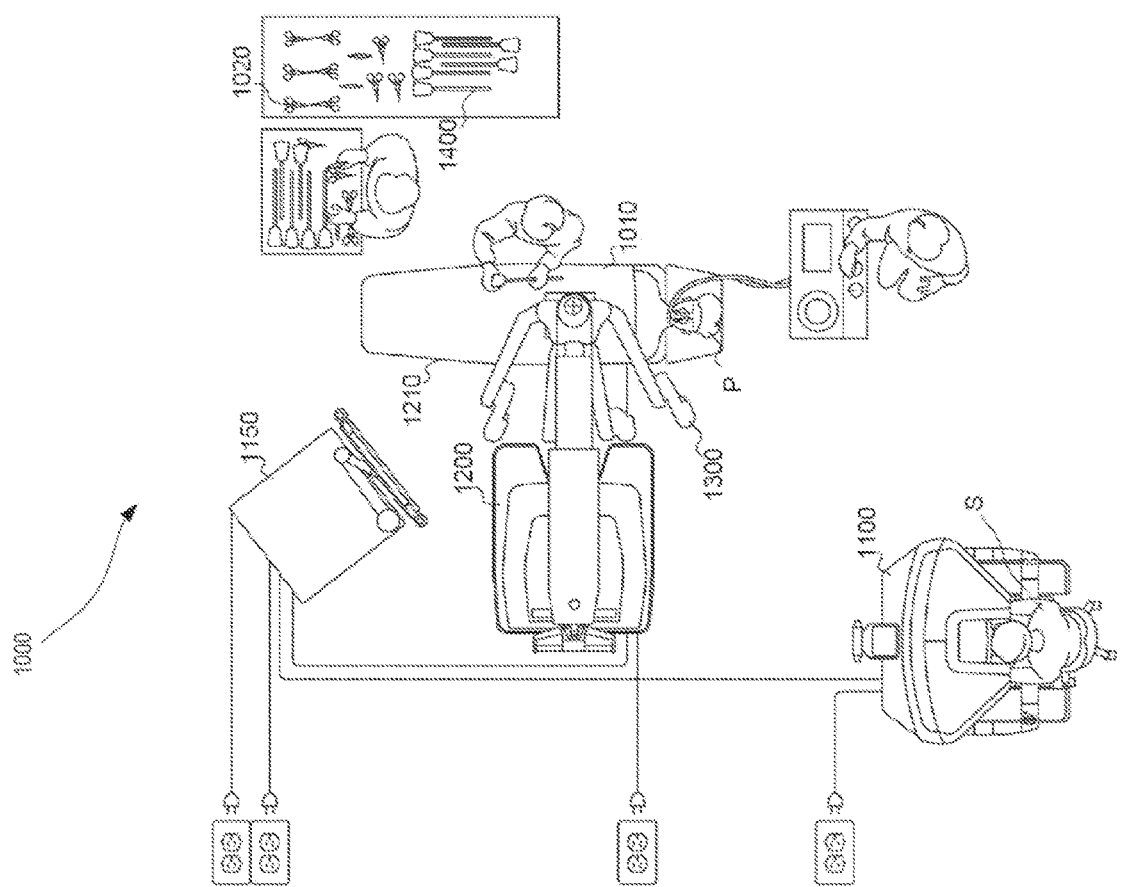
FIG. 1 is a plan view of a minimally invasive teleoperated medical system according to an embodiment being used to perform a medical procedure such as surgery.

The embodiments described herein can advantageously be used in a wide variety of grasping, cutting, and manipulating operations associated with minimally invasive surgery.

The medical instruments of the present application enable motion in three or more degrees of freedom (e.g., about a pitch axis, a yaw axis, and a grip axis), and can accommodate any suitable number of cables to accommodate the desired motion. Specifically, the medical instruments described herein include wrist mechanisms that can produce retroflex motion and that are actuated by eight or more cables. The mechanical structures described herein that move the cables to operate a wrist mechanism include mechanisms that can move multiple cables in different amounts or at different speeds via a single input. For example, the embodiments described herein can include one or more capstan assemblies that include a first drive member that drives a first cable pair at a first speed and a second drive member that drives a second cable pair at a second speed. By having a single capstan assembly (which is rotated by a single rotary input) move two cable pairs (i.e., four cables), the space required within the mechanical structure is reduced (as is the required number of drive inputs or capstans required to accomplish the motion) and the architecture for coupling the instrument to current MIRS systems can be maintained. The embodiments described herein also limit the number of parts needed, thereby reducing overall cost and enabling further miniaturization of the medical instruments to promote MIS procedures. Moreover, the medical instruments described herein provide improved control of the cable movement for operating the wrist mechanisms.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

The term "flexible" in association with a part, such as a mechanical structure, component, or component assembly, should be broadly construed. In essence, the term means the part can be repeatedly bent and restored to an original shape without harm to the part. Certain flexible components can also be resilient. For example, a component (e.g., a flexure) is said to be resilient if possesses the ability to absorb energy when it is deformed elastically, and then release the stored energy upon unloading (i.e., returning to its original state). Many "rigid" objects have a slight inherent resilient "bendiness" due to material properties, although such objects are not considered "flexible" as the term is used herein.

As used in this specification and the appended claims, the word "distal" refers to direction towards a work site, and the word "proximal" refers to a direction away from the work site. Thus, for example, the end of a tool that is closest to the target tissue would be the distal end of the tool, and the end opposite the distal end (i.e., the end manipulated by the user or coupled to the actuation shaft) would be the proximal end of the tool.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations. The combination of a body's position and orientation define the body's pose.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Unless indicated otherwise, the terms apparatus, medical device, instrument, and variants thereof, can be interchangeably used.

Aspects of the invention are described primarily in terms of an implementation using a da Vinci® Surgical System, commercialized by Intuitive Surgical, Inc. of Sunnyvale, California. Examples of such surgical systems are the da Vinci Xi® Surgical System (Model IS4000), the da Vinci X® Surgical System (Model IS4200), and the da Vinci Si® Surgical System (Model IS3000). Knowledgeable persons will understand, however, that inventive aspects disclosed herein may be embodied and implemented in various ways, including computer-assisted, non-computer-assisted, and hybrid combinations of manual and computer-assisted embodiments and implementations. Implementations on da Vinci® Surgical Systems (e.g., the Model IS4000, the Model IS3000, the Model IS2000, the Model IS1200) are merely presented as examples, and they are not to be considered as limiting the scope of the inventive aspects disclosed herein. As applicable, inventive aspects may be embodied and implemented in both relatively smaller, hand-held, hand-operated devices and relatively larger systems that have additional mechanical support.

FIG. 1 is a plan view illustration of a computer-assisted teleoperation system. Shown is a medical device, which is a Minimally Invasive Robotic Surgical (MIRS) system 1000 (also referred to herein as a minimally invasive teleoperated surgery system), used for performing a minimally invasive diagnostic or surgical procedure on a Patient P who is lying on an Operating table 1010. The system can have any number of components, such as a user control unit 1100 for use by a surgeon or other skilled clinician S during the procedure. The MIRS system 1000 can further include a manipulator unit 1200 (popularly referred to as a surgical robot), and an optional auxiliary equipment unit 1150. The manipulator unit 1200 can include an arm assembly 1300 and a tool assembly removably coupled to the arm assembly. The manipulator unit 1200 can manipulate at least one removably coupled instruments 1400 (also referred to herein as a "tool") through a minimally invasive incision in the body or natural orifice of the patient P while the surgeon S views the surgical site and controls movement of the instrument 1400 through control unit 1100. An image of the surgical site is obtained by an endoscope (not shown), such as a stereoscopic endoscope, which can be manipulated by the manipulator unit 1200 to orient the endoscope. The auxiliary equipment unit 1150 can be used to process the images of the surgical site for subsequent display to the Surgeon S through the user control unit 1100. The number of instruments 1400 used at one time will generally depend on the diagnostic or surgical procedure and the space constraints within the operating room, among other factors. If it is necessary to change one or more of the instruments 1400 being used during a procedure, an assistant removes the instrument 1400 from the manipulator unit 1200 and replaces it with another instrument 1400 from a tray 1020 in the operating room. Although shown as being used with the instruments 1400, any of the instruments described herein can be used with the MIRS 1000.

Figure 2:
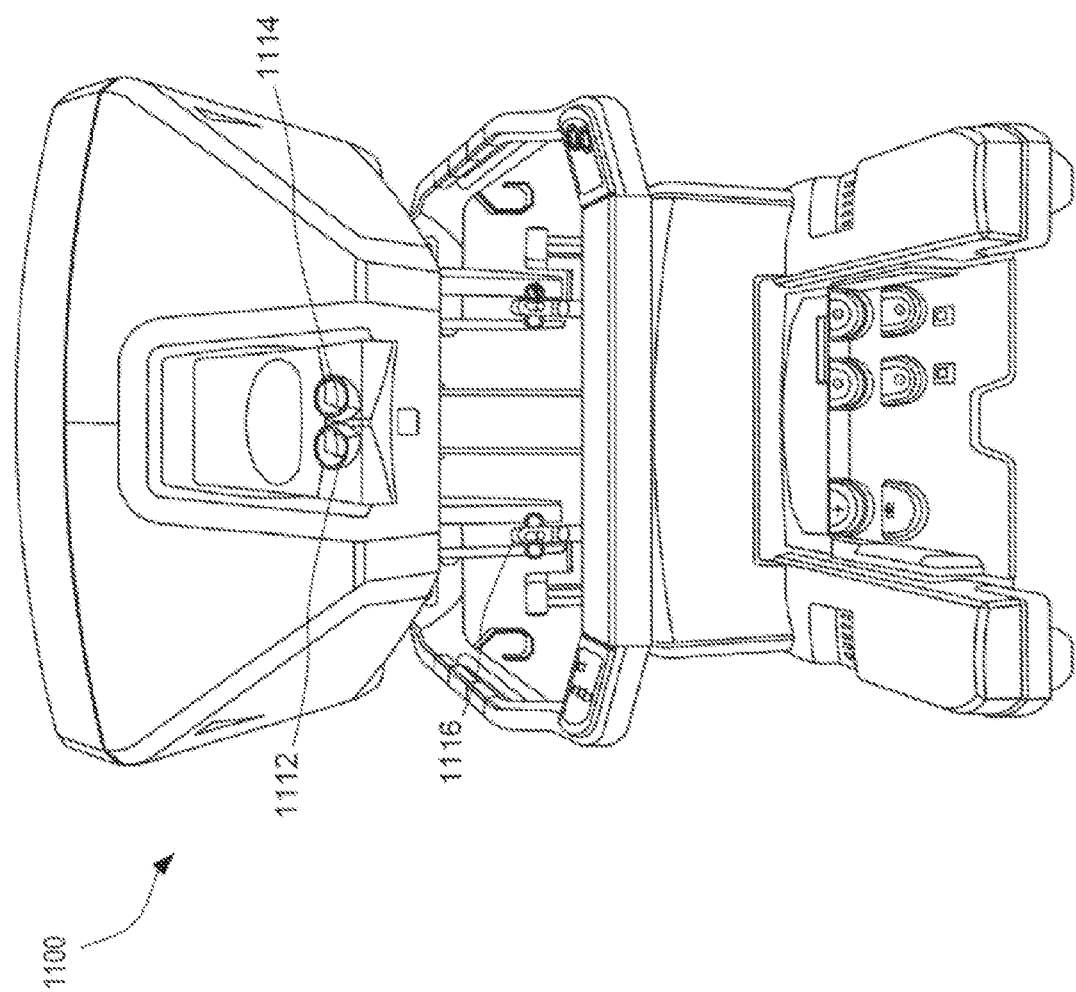
FIG. 2 is a perspective view of an optional auxiliary unit of the minimally invasive teleoperated surgery system shown in FIG. 1.

FIG. 2 is a perspective view of the control unit 1100. The user control unit 1100 includes a left eye display 1112 and a right eye display 1114 for presenting the surgeon S with a coordinated stereo view of the surgical site that enables depth perception. The user control unit 1100 further includes one or more input control devices 1116, which in turn cause the manipulator unit 1200 (shown in FIG. 1) to manipulate one or more tools. The input control devices 1116 provide at least the same degrees of freedom as instruments 1400 with which they are associated to provide the surgeon S with telepresence, or the perception that the input control devices 1116 are integral with (or are directly connected to) the instruments 1400. In this manner, the user control unit 1100 provides the surgeon S with a strong sense of directly controlling the instruments 1400. To this end, position, force, and tactile feedback sensors (not shown) may be employed to transmit position, force, and tactile sensations from the instruments 1400 back to the surgeon's hands through the input control devices 1116.

The user control unit 1100 is shown in FIG. 1 as being in the same room as the patient so that the surgeon S can directly monitor the procedure, be physically present if necessary, and speak to an assistant directly rather than over the telephone or other communication medium. In other embodiments however, the user control unit 1100 and the surgeon S can be in a different room, a completely different building, or other remote location from the patient allowing for remote surgical procedures.

Figure 3:
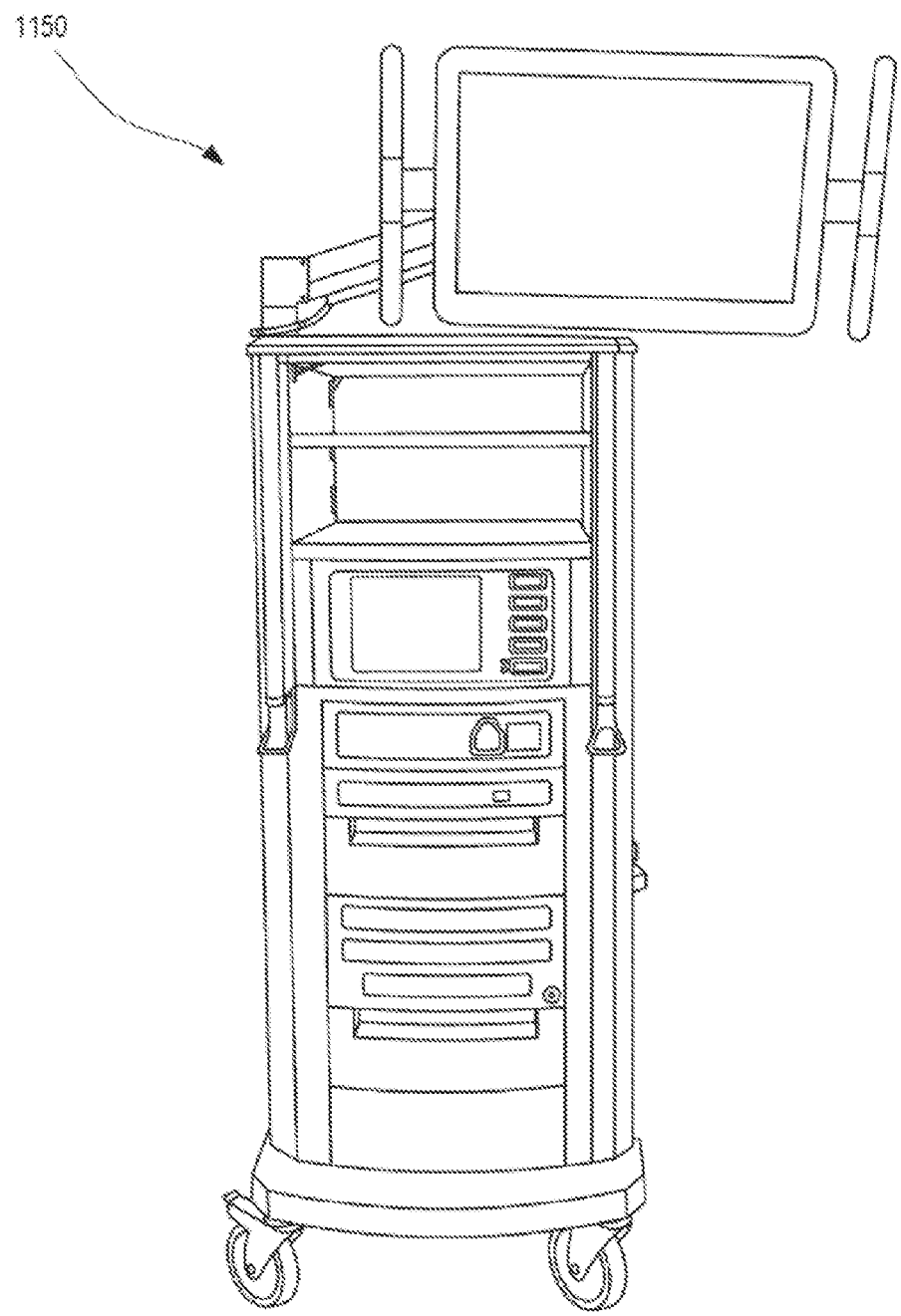
FIG. 3 is a perspective view of a user control console of the minimally invasive teleoperated surgery system shown in FIG. 1.

FIG. 3 is a perspective view of the auxiliary equipment unit 1150. The auxiliary equipment unit 1150 can be coupled with the endoscope (not shown) and can include one or more processors to process captured images for subsequent display, such as via the user control unit 1100, or on another suitable display located locally and/or remotely. For example, where a stereoscopic endoscope is used, the auxiliary equipment unit 1150 can process the captured images to present the surgeon S with coordinated stereo images of the surgical site via the left eye display 1112 and the right eye display 1114. Such coordination can include alignment between the opposing images and can include adjusting the stereo working distance of the stereoscopic endoscope. As another example, image processing can include the use of previously determined camera calibration parameters to compensate for imaging errors of the image capture device, such as optical aberrations.

Figure 4:
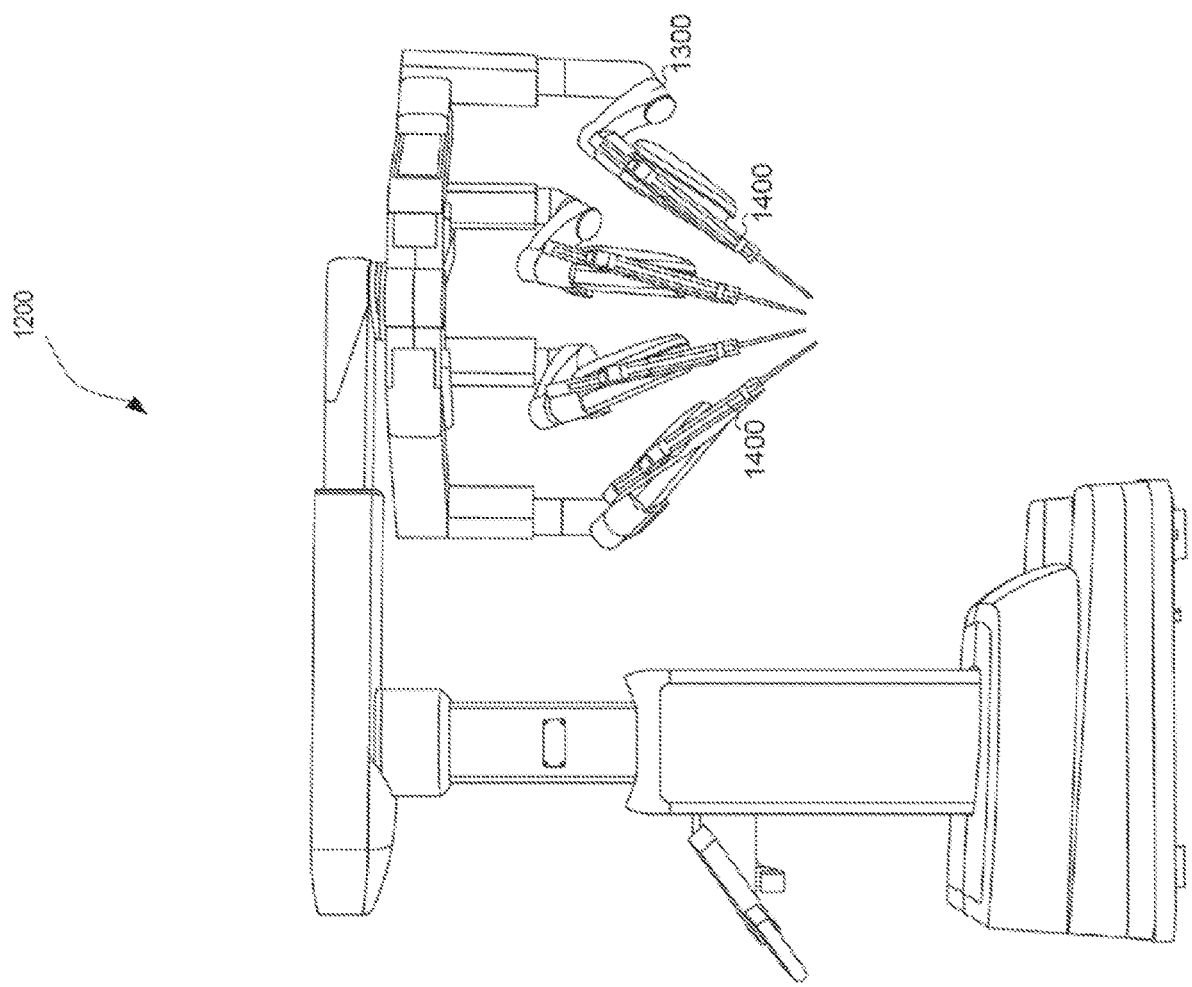
FIG. 4 is a front view of a manipulator unit, including a plurality of instruments, of the minimally invasive teleoperated surgery system shown in FIG. 1.

FIG. 4 shows a front perspective view of the manipulator unit 1200. The manipulator unit 1200 includes the components (e.g., arms, linkages, motors, sensors, and the like) to provide for the manipulation of the instruments 1400 and an imaging device (not shown), such as a stereoscopic endoscope, used for the capture of images of the site of the procedure. Specifically, the instruments 1400 and the imaging device can be manipulated by teleoperated mechanisms having a number of joints. Moreover, the instruments 1400 and the imaging device are positioned and manipulated through incisions or natural orifices in the patient P in a manner such that a software and/or kinematic remote center of motion is maintained at the incision or orifice. In this manner, the incision size can be minimized.

Figure 5:
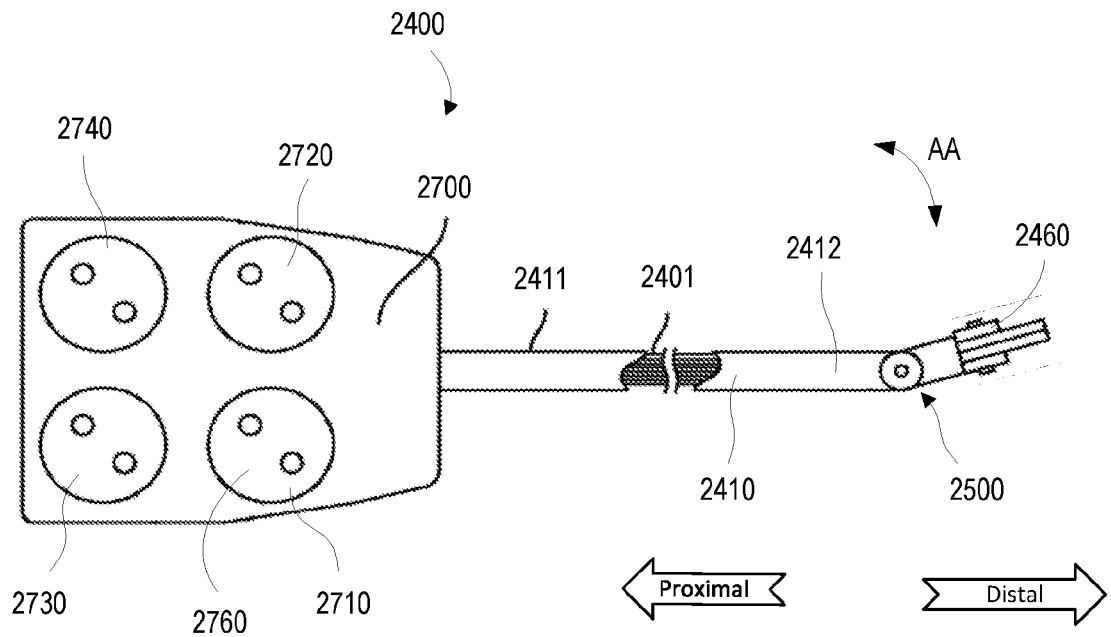
FIGS. 5-6 are diagrammatic illustrations of a medical instrument according to an embodiment showing a back view (FIG. 5) and a front view (FIG. 6).
Figure 6:
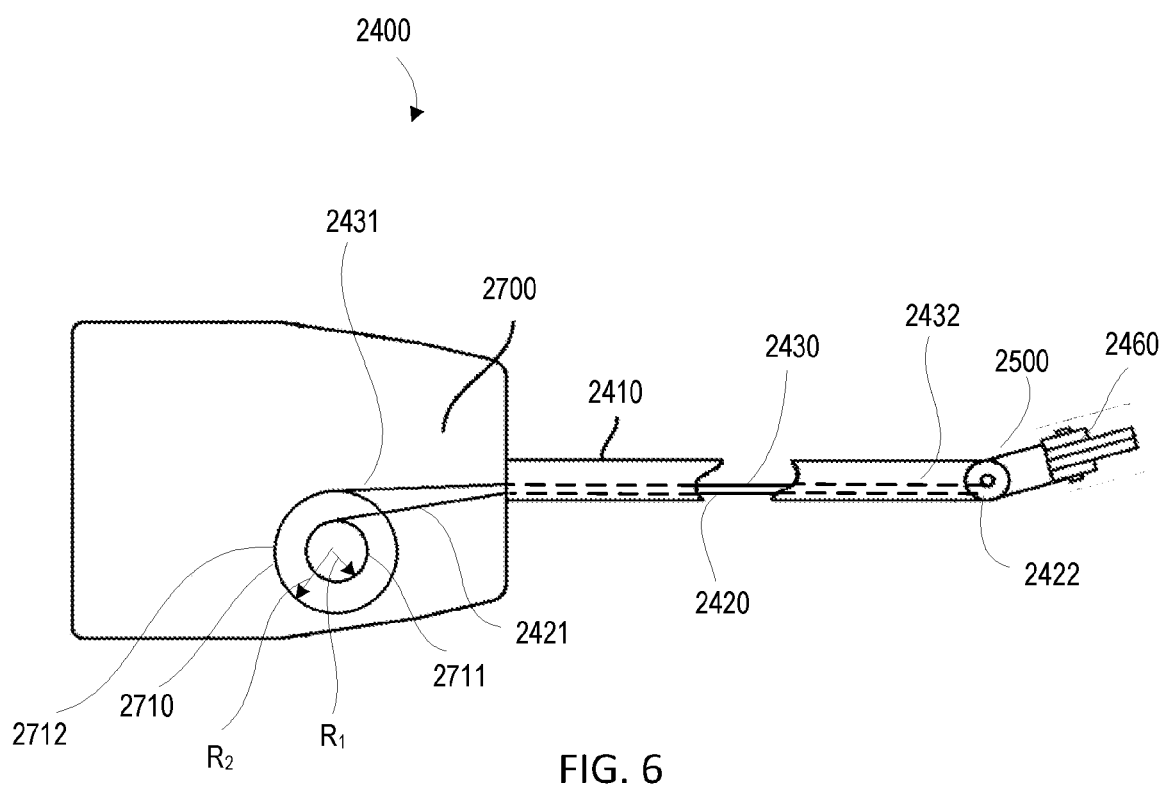
Figure 7:
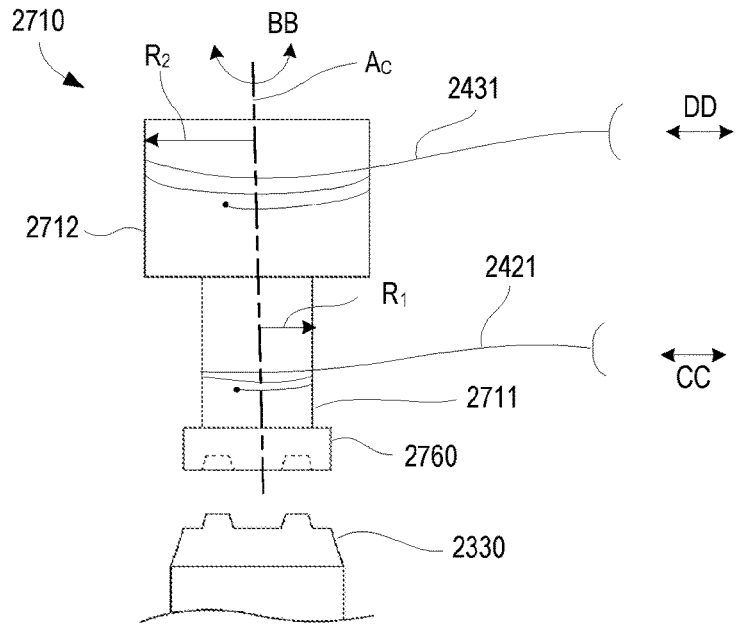
FIG. 7 is a side view of a capstan assembly of the medical instrument shown in FIGS. 5 and 6.

FIGS. 5-7 are schematic illustrations of a medical instrument 2400 according to an embodiment. The instrument 2400 includes a shaft 2410, a wrist 2500, an end effector 2460, a mechanical structure 2700, and a set of cables 2401. The shaft 2410 includes a proximal end portion 2411 and a distal end portion 2412 and can be any suitable elongated structure that couples the wrist 2500 to the mechanical structure 2700. In some embodiments, the shaft 2410 (and any of the shafts described herein) can define a lumen through which the cables 2401 and other components (e.g., electrical wires) that operate the wrist 2500 and the end effector 2460 are routed. The end effector 2460 is coupled to the distal end portion 2412 of the shaft 2410 via the wrist 2500. The end effector 2460 (and any of the end effectors described herein) can be any suitable mechanism for grasping, cutting, and manipulating tissue or other objects during an MIS procedure. For example, in some embodiments, the end effector 2460 (and any of the end effectors described herein) can include forceps, a cutting tool, a cauterizing tool, a stapler, or a suture driver. The end effector 2460 can include one or more components (e.g., tool members) actuated by one or more of the cables 2401.

The wrist 2500 includes one or more links (not shown in FIGS. 5-7), which function as movable components that couple the end effector 2460 to the distal end portion 2412 of the shaft 2410. The links of the wrist 2500 rotate relative to each other (and the shaft 2410) about one or more axes of rotation to produce the desired degrees of freedom. For example, in some embodiments, the links of the wrist 2500 can rotate about a first axis of rotation, as shown by the arrow AA, which functions as the pitch axis (the term pitch is arbitrary). In some embodiments, the links of the wrist 2500 can rotate about a second axis of rotation (e.g., that is normal to the first axis of rotation), which functions as the yaw axis (the term yaw is arbitrary). In some embodiments, the wrist 2500 can include a set of links that are coupled together by pinned joints that define the axes of rotation. In other embodiments, the links that are coupled together via mating disc surfaces of the types shown and described herein (see e.g., the wrist 7500 described below). In yet other embodiments, the links that are coupled together via mating spherical surface surfaces such that one pair of mating links can rotate about multiple different rotation axes. In some embodiments, the wrist 2500 (and any of the wrists described herein) can include one or more links coupled together in a manner that can produce retroflex motion about one or more rotation axes.

The mechanical structure 2700 functions a transmission or a transmission assembly to move the wrist 2500 and the end effector 2460 to perform the desired operations. The mechanical structure 2700 also interfaces with other portions of the surgical system, such as, for example, the manipulator unit 1200 or arm assembly 1300 described above. In some embodiments, the mechanical structure 2700 (and any of the mechanical structures described herein) can include one or more drive motors to produce the force or torque to move the components of the medical instrument 2400. In other embodiments, mechanical structure 2700 (and any of the mechanical structures described herein) is devoid of any motors therein. For example, as shown in FIG. 7, the mechanical structure 2700 (and any of the mechanical structures described herein) can be coupled to or driven by an actuator 2330 (e.g., of a manipulator unit, not shown), which provides a rotary input to the mechanical structure 2700.

As shown in FIG. 5, the mechanical structure 2700 is coupled to the proximal end portion 2411 of the shaft 2410 and includes a set of capstan assemblies that move the cables 2401. Specifically, although the mechanical structure 2700 is shown as including four capstan assemblies (i.e., a first capstan assembly 2710, a second capstan assembly 2720, a third capstan assembly 2730, and a fourth capstan assembly 2740), in other embodiments, the mechanical structure 2700 (and any of the mechanical structures described herein) can include any suitable number of capstan assemblies. Moreover, the mechanical structure 2700 (and any of the mechanical structures described herein) can include any other suitable components (e.g., pulleys, geared mechanisms, or transfer mechanisms) to produce the desired movement and routing of the cables 2401 within the mechanical structure 2700 and the shaft 2410.

The first capstan assembly 2710 (also referred to as the capstan assembly) includes an input disc 2760, a first cable drum 2711, and a second cable drum 2712. The capstan assembly 2710 also defines a capstan axis $A_c$ about which the capstan assembly 2710 rotates. As shown in FIG. 7, when the mechanical structure 2700 is coupled within a surgical system, the input disc 2760 engages the actuator 2330. In use, the actuator 2330 can drive (i.e., produce a rotary input into) the input disc 2760 to rotate the capstan assembly 2710 about the capstan axis $A_c$, as shown by the arrow BB in FIG. 7. The first cable drum 2711 (which functions as a first drive member) is coupled to a first cable 2420 from the set of cables 2401 and has a first radius $R_1$. The first radius $R_1$ is perpendicular to the capstan axis $A_c$, and thus is a radius of rotation of the first cable drum 2711. The second cable drum 2712 (which functions as a second drive member) is coupled to a second cable 2430 from the set of cables 2401 and has a second radius $R_2$ that is different than the first radius $R_1$. The second radius $R_2$ is perpendicular to the capstan axis $A_c$, and thus is a radius of rotation of the second cable drum 2712. Although the second radius $R_2$ is shown as being larger than the first radius $R_1$, in other embodiments, the second radius $R_2$ can be smaller than the first radius $R_1$.

The set of cables 2401 can include any suitable number of cables routed within or coupled to the wrist 2500 and the end effector 2460 to produce the desired motion when the cables are moved. Specifically, the set of cables 2401 includes at least a first cable 2420 and a second cable 2430. The first cable 2420 (which functions as a tension member) includes a proximal end portion 2421 and a distal end portion 2422. The first cable 2420 is routed along the shaft 2410 with the distal end portion 2422 being coupled to the wrist 2500 and the proximal end portion 2421 being wrapped about the first cable drum 2711. The second cable 2430 (which functions as a tension member) includes a proximal end portion 2431 and a distal end portion 2432. The second cable 2430 is routed along the shaft 2410 with the distal end portion 2432 being coupled to the wrist 2500 and the proximal end portion 2431 being wrapped about the second cable drum 2712. Although the first cable 2420 and the second cable 2430 are shown extending within an interior lumen of the shaft 2410, in other embodiments, any of the cables 2401 can be routed exterior to the shaft 2410. Moreover, the first cable 2420 and the second cable 2430 can be coupled to the wrist 2500 and their respective cable drum by any suitable mechanism, such as by securing a cable crimp within a mating slot (or pinch point), by wrapping the cable about the cable drum (or wrist) in a manner that prevents slip, or by an adhesive.

With the first cable 2420 and the second cable 2430 each coupled to the capstan assembly 2710 and to the wrist 2500, rotational movement of the first capstan 2710 can cause the first cable 2420 and the second cable 2430 to move thereby operating the wrist 2500. Specifically, when the actuator 2330 engages the input disc 2760, the rotary input from the actuator 2330 rotates the capstan assembly 2710 (including the first cable drum 2711 and the second cable drum 2712) about the capstan axis $A_c$, as shown by the arrow BB in FIG. 7. Rotation of the first cable drum 2711 causes the proximal end portion 2421 of the first cable 2420 to move in a direction CC, as shown in FIG. 7. Similarly, rotation of the second cable drum 2712 causes the proximal end portion 2431 of the second cable 2430 to move in a direction DD, as shown in FIG. 7. Because the first radius $R_1$ is of a different size than the second radius $R_2$, rotation of the capstan assembly 2710 through a specific angular displacement causes the proximal end portion 2421 of the first cable 2420 to move a first distance and the proximal end portion 2431 of the second cable 2430 to move a second, different distance. Similarly, rotation of the capstan assembly 2710 at a specific angular speed causes the proximal end portion 2421 of the first cable 2420 to move at first linear speed and the proximal end portion 2431 of the second cable 2430 to move at a second, different linear speed. The difference between first distance and the second distance (and the first linear speed and the second linear speed) is related to the difference between the first radius $R_1$ and the second radius $R_2$. For example, if the ratio between the second radius $R_2$ and the first radius $R_1$ is 2:1, then the distance through which the second cable 2430 moves and the linear speed at which the second cable 2430 moves will be twice that of the first cable 2420.

This arrangement can advantageously allow for a single capstan to produce different amounts of cable movement or cable speed. Different cable motion characteristics can improve the operation of the wrist 2500 and/or the end effector 2460. For example, in some embodiments, the wrist 2500 can include a set of links that define multiple bend axes. When such a wrist is operated, a first cable (e.g., one that actuates the proximal-most links) will have a shorter cable path than a second cable (e.g., one that actuates the distal-most links). In this situation, the movement (or speed) of the first cable should be less than that of the second cable. The capstan assembly 2710 (and the other capstan assemblies described herein) can produce the desired different amounts of movement (or cable speed) with a single input, thereby preserving space in the mechanical structure 2700 and allowing the mechanical structure 2700 to be driven by existing interfaces.

As shown in FIG. 7, the proximal end portion 2421 of the first cable 2420 is wrapped about a first side (or in a first wrap direction) of the first cable drum 2711 and the proximal end portion 2431 of the second cable 2430 is wrapped about a first side (or in a first wrap direction) of the second cable drum 2712. In this manner, rotation of the capstan assembly 2710 about the capstan axis $A_c$, moves the first cable 2420 and the second cable 2430 in the same direction (e.g., either both pulling in or both paying out the ends of each cable). In other embodiments, however, the proximal end portion 2421 of the first cable 2420 can be wrapped about a first side (or in a first wrap direction) of the first cable drum 2711 and the proximal end portion 2431 of the second cable 2430 can wrapped about a second, opposite side (or in a second, opposite wrap direction) of the second cable drum 2712. In this manner, rotation of the capstan assembly 2710 about the capstan axis $A_c$, moves the first cable 2420 in a first direction and the second cable 2430 in a second, opposite direction. This causes the first cable 2420 to be pulling in while the second cable 2430 is paying out, or vice-versa.

Although the medical instrument 2400 is shown and described as including the first cable 2420 wrapped about the first cable drum 2711 and the second cable 2430 wrapped about the second cable drum 2712, in other embodiments, the medical instrument 2400 can include additional cables wrapped about (and moved by) the first cable drum 2711 and the second cable drum 2712. For example, in some embodiments, the medical instrument 2400 (or any of the medical instruments described herein) can include a third cable (not shown) wrapped about the first cable drum and a fourth cable (not shown) wrapped about the second cable drum. In this arrangement, rotation can cause the first cable to pay out by a first distance (or at a first speed) and the third cable to pull in by the first distance (or at the first speed). Rotation can also cause the second cable to pay out by a second distance (or at a second speed) and the fourth cable to pull in by the second distance (or at the second speed). In this manner, the capstan assembly 2700 can move four cables with one rotary input.

Figure 8:
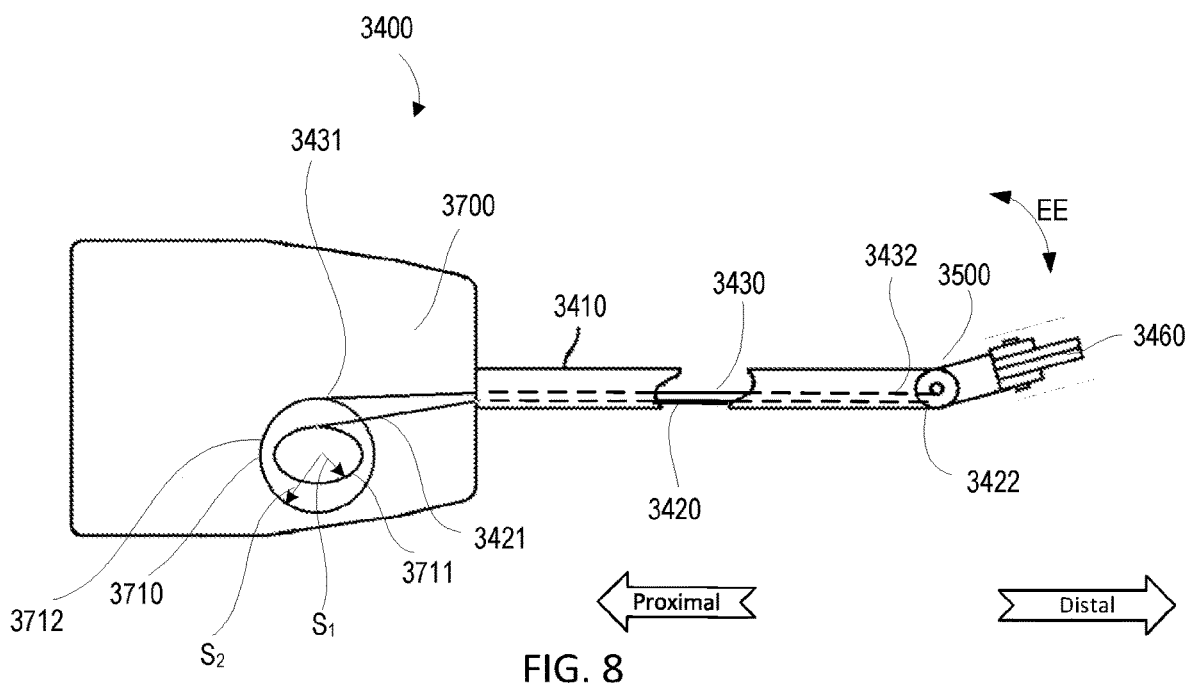
FIG. 8 is front view diagrammatic illustration of a medical instrument according to an embodiment.

Although the first cable drum 2711 and the second cable drum 2712 are each shown as being cylindrical and having a first radius $R_1$ and a second radius $R_2$, respectively, in other embodiments, any of the cable drums or drive members described herein can have a non-circular cross-sectional shape. For example, in some embodiments, any of the of the cable drums or drive members described herein can have an oblong shape, similar to a camshaft lobe, to change the distance or speed of movement of the cable pulling in or paying out from the cable drum. In this manner, even when the capstan assembly is rotating at a constant angular speed, the linear speed of the cable can be variable as a function of the angular position of the capstan assembly. For example, FIG. 8 is a front view schematic illustration of a medical instrument 3400 according to an embodiment. Like the instrument 2400 described above, the instrument 3400 includes a shaft 3410, a wrist 3500, an end effector 3460, a mechanical structure 3700, and at least a first cable 3420 and a second cable 3430. The shaft 3410 includes a proximal end portion 3411 and a distal end portion 3412 and can be any suitable elongated structure that couples the wrist 3500 to the mechanical structure 3700. The end effector 3460 is coupled to the distal end portion 3412 of the shaft 3410 via the wrist 3500. The end effector 3460 (and any of the end effectors described herein) can be any suitable mechanism for grasping, cutting, and manipulating tissue or other objects during an MIS procedure. For example, in some embodiments, the end effector 3460 (and any of the end effectors described herein) can include forceps, a cutting tool, a cauterizing tool, a stapler, or a suture driver. The end effector 3460 can include one or more components (e.g., tool members) actuated by one or more cables. The wrist 3500 can be similar in structure and function to the wrist 2400 and is therefore not described in detail herein. Specifically, as described above, the links of the wrist 3500 can rotate about a first axis of rotation, as shown by the arrow EE, which functions as the pitch axis (the term pitch is arbitrary). In some embodiments, the links of the wrist 3500 can rotate about a second axis of rotation (e.g., that is normal to the first axis of rotation), which functions as the yaw axis (the term yaw is arbitrary).

The mechanical structure 3700 functions a transmission or a transmission assembly to move the wrist 3500 and the end effector 3460 to perform the desired operations. The mechanical structure 3700 also interfaces with other portions of the surgical system, such as, for example, the manipulator unit 1200 or arm assembly 1300 described above. For example, like the mechanical structure 2700, the mechanical structure 3700 can be coupled to or driven by an actuator (e.g., of a manipulator unit, not shown), which provides a rotary input to the mechanical structure 3700. The mechanical structure 3700 is coupled to the proximal end portion 3411 of the shaft 3410 and includes one or more capstan assemblies that move the cables within the instrument 3410. Specifically, the mechanical structure 3700 includes a first capstan assembly 3710, having an input disc (not shown), a first cable drum 3711, and a second cable drum 3712. The capstan assembly 3710 also defines a capstan axis about which the capstan assembly 3710 rotates. In use, the actuator (not shown) can produce a rotary input to rotate the capstan assembly 3710 about the capstan axis. The first cable drum 3711 (which functions as a first drive member) is coupled to the first cable 3420 and the second cable drum 3712 (which functions as a second drive member) is coupled to a first cable 3430.

As shown, the first cable drum 3711 has a non-circular cross-sectional shape characterized by a first size $S_1$. The cross-sectional shape of the first cable drum 3711 can be an oblong shape having desired profile (e.g., like a cam profile). The first size $S_1$ can be the radius of a base circle of the oblong shape. In other embodiments, the first size $S_1$ can be a radius of curvature of a portion of the oblong shape of the first cable drum 3711. Like second cable drum 2711, the second cable drum 3712 has a circular cross-sectional shape characterized by a second size $S_2$, which can be the radius of the second cable drum 3712. As shown, the second size $S_2$ is larger than the first size $S_1$. In other embodiments, the second size $S_2$ can be smaller than the first size $S_1$.

As shown, the first cable 3420 (which functions as a tension member) includes a proximal end portion 3421 and a distal end portion 3422. The first cable 3420 is routed along the shaft 3410 with the distal end portion 3422 being coupled to the wrist 3500 and the proximal end portion 3421 being coupled to the first cable drum 3711. The second cable 3430 (which functions as a tension member) includes a proximal end portion 3431 and a distal end portion 3432. The second cable 3430 is routed along the shaft 3410 with the distal end portion 3432 being coupled to the wrist 3500 and the proximal end portion 3431 being coupled to the second cable drum 3712. The first cable 3420 and the second cable 3430 can be coupled to the wrist 3500 and their respective cable drum by any suitable mechanism, such as by securing a cable crimp within a mating slot (or pinch point), by wrapping the cable about the cable drum (or wrist) in a manner that prevents slip, or by an adhesive.

With the first cable 3420 and the second cable 3430 each coupled to the capstan assembly 3710 and to the wrist 3500, rotational movement of the first capstan 3710 can cause the first cable 3420 and the second cable 3430 to move thereby operating the wrist 3500. Rotation of the first cable drum 3711 causes the proximal end portion 3421 of the first cable 3420 to move linearly. Similarly, rotation of the second cable drum 3712 causes the proximal end portion 3431 of the second cable 3430 to move linearly. Because the first size $S_1$ is different than the second size $S_2$, rotation of the capstan assembly 3710 through a specific angular displacement causes the proximal end portion 3421 of the first cable 3420 to move a first distance and the proximal end portion 3431 of the second cable 3430 to move a second, different distance. Similarly, rotation of the capstan assembly 3710 at a specific angular speed causes the proximal end portion 3421 of the first cable 3420 to move at first linear speed and the proximal end portion 3431 of the second cable 3430 to move at a second, different linear speed. Moreover, because the first cable drum 3711 has a non-circular shape, the linear velocity of the first cable 3420 being released from or pulled into the first cable drum 3711 varies as a function of the angular position of the capstan assembly 3710. Thus, the non-circular shape of the first cable drum 3710 can provide an additional level of control over movement of the wrist 3500.

Although capstan assembly 3710 is shown and described as including a non-cylindrical first cable drum 3711 and a cylindrical second cable drum 3712, in other embodiments, a capstan assembly can include two (or more) non-cylindrical cable drums. In yet other embodiments, the second cable drum 3712 can be non-cylindrical and the first cable drum 3711 can be cylindrical.

Figure 9:
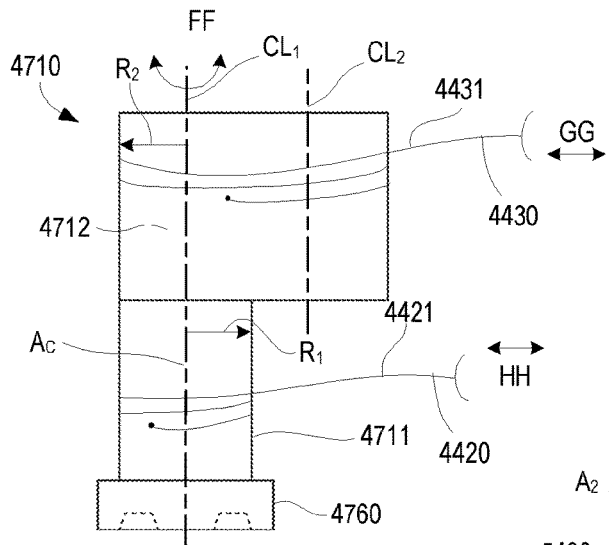
FIG. 9 is a side view of a capstan assembly of a medical instrument, according to an embodiment.

Although the first cable drum 2711 and the second cable drum 2712 are shown as being concentric with the capstan axis $A_c$, in other embodiments, a capstan assembly can include one or more cable drums or drive members that are non-concentric with the capstan axis $A_c$. Said another way, in some embodiments, a capstan assembly can include one or more cable drums or drive members having a center line that is non-concentric with the axis of rotation of the capstan assembly. For example, FIG. 9 is a side view schematic illustration of a portion of a medical instrument, according to an embodiment. Specifically, FIG. 9 shows a capstan assembly 4710 coupled to a first cable 4420 and a second cable 4430. The capstan assembly 4710 can be included in any of the mechanical structures or medical instruments described herein.

As shown, the capstan assembly 4710 includes an input disc 4760, a first cable drum 4711, and a second cable drum 4712. The capstan assembly 4710 also defines a capstan axis $A_c$ about which the capstan assembly 4710 rotates. Thus, when the mechanical structure is coupled within a surgical system (not shown), the input disc 4760 engages an actuator (not shown). The actuator can produce a rotary input into the input disc 4760 to rotate the capstan assembly 4710 about the capstan axis $A_c$, as shown by the arrow FF in FIG. 9. The first cable drum 4711 (which functions as a first drive member) is coupled to the first cable 4420 and has a first radius (or size). The first cable drum 4711 defines a first center line $CL_1$ that is concentric with the capstan axis $A_c$. Thus, when the capstan assembly 4710 rotates about the capstan axis $A_c$ the first cable drum 4711 rotates about its center line $CL_1$. The second cable drum 4712 (which functions as a second drive member) is coupled to the second cable 4430 and has a second radius (or size) that is different than the first radius (or size). Although the second radius is shown as being larger than the first radius, in other embodiments, the second radius can be smaller than the first radius. The second cable drum 4712 defines a second center line $CL_2$ that is non-concentric with the capstan axis $A_c$. Thus, when the capstan assembly 4710 rotates about the capstan axis $A_c$, the second cable drum 4712 does not rotates about its center line $CL_2$. This arrangement can produce an eccentric motion of the second cable drum 4712.

With the first cable 4420 and the second cable 4430 each coupled to the capstan assembly 4710 and to a wrist (not shown, but which can be similar to the wrist 2500), rotational movement of the capstan assembly 4710 can cause the first cable 4420 and the second cable 4430 to move thereby operating the wrist. Specifically, rotation of the capstan assembly 4710 about the capstan axis $A_c$, causes the first cable drum 4711 to rotate about the first center line $CL_1$ and the second cable drum 4712 to rotate about an axis offset from the second center line $CL_2$. Rotation of the first cable drum 4711 causes the proximal end portion 4421 of the first cable 4420 to move in a direction GG, as shown in FIG. 9. Similarly, rotation of the second cable drum 4712 causes the proximal end portion 4431 of the second cable 4430 to move in a direction HH, as shown in FIG. 9. Because the size (e.g. radius) of the first cable drum 4711 is different than the size of the second cable drum 4712, rotation of the capstan assembly 4710 through a specific angular displacement causes the proximal end portion 4421 of the first cable 4420 to move a first distance and the proximal end portion 4431 of the second cable 4430 to move a second, different distance. Similarly, rotation of the capstan assembly 4710 at a specific angular speed causes the proximal end portion 4421 of the first cable 4420 to move at first linear speed and the proximal end portion 4431 of the second cable 4430 to move at a second, different linear speed. Additionally, because the second center line $CL_2$ is offset from the axis of rotation (i.e., the capstan axis $A_c$), the linear movement of the second cable is greater than the movement would be if the second center line $CL_2$ was concentric with the axis of rotation.

Figure 10:
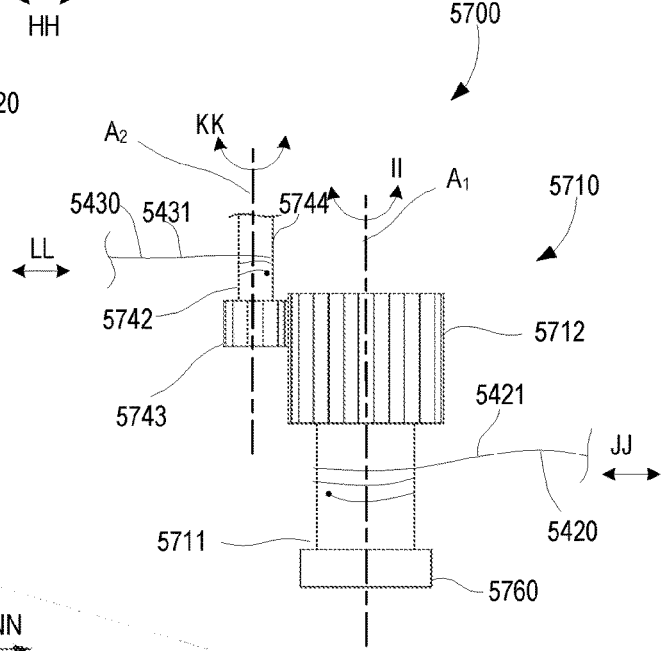
FIG. 10 is a side view of a capstan assembly of a medical instrument including a cable drum and drive gear, according to an embodiment.

Although the capstan assemblies 2710, 3710, and 4710 are shown and described as including two cable drums that are coupled to and drive two (or more) cables, in other embodiments, a capstan assembly can include any suitable drive members or mechanisms for driving two (or more) cables. For example, in some embodiments, a capstan assembly can include one or more cable drums (of the types described herein), one or more gears (that are indirectly coupled to a cable), or any combination of cable drums and gears. Other drive members can include sprockets, belt drive systems, or other mechanisms through which a set of cables can be drive by a capstan assembly. For example, FIG. 10 is a side view schematic illustration of a portion of a mechanical structure 5700, according to an embodiment. The mechanical structure 5700 includes a capstan assembly 5710 and a transfer member 5742 that drive a first cable 5420 and a second cable 5430. The mechanical structure 5700 and any of its components (e.g., the capstan assembly 5710 and the transfer member 5742) can be included in any of the mechanical structures or medical instruments described herein.

As shown, the capstan assembly 5710 includes an input disc 5760, a first drive member 5711, and a second drive member 5712. The capstan assembly 5710 also defines a first axis $A_1$ about which the capstan assembly 5710 rotates. Thus, when the mechanical structure is coupled within a surgical system (not shown), the input disc 5760 engages an actuator (not shown). The actuator can produce a rotary input into the input disc 5760 to rotate the capstan assembly 5710 about the first axis $A_1$, as shown by the arrow II in FIG. 10. The first drive member 5711 is a cable drum having a first size (e.g., radius) that is coupled to the proximal end portion 5721 of the first cable 5420. The second drive member 5712 is a drive gear having a second radius (or size) that, as described below, is indirectly coupled to the proximal end portion 5731 of the second cable 5430.

The transfer member 5742 includes a driven gear 5743 and a drum portion 5744. The transfer member 5742 also defines a second axis $A_2$ about which the transfer member 5742 rotates. The drum portion 5744 of the transfer member 5742 has a second size (e.g., radius) and is coupled to the proximal end portion 5731 of the second cable 5430. The driven gear 5743 is engaged with the drive gear 5712 of the capstan assembly 5710. Thus, rotational movement of the capstan assembly 5710 causes the first cable 5420 and the second cable 5430 to move thereby operating a wrist (not shown). Specifically, rotation of the capstan assembly 5710 about the first axis $A_1$, causes the cable drum 5711 to rotate about the first axis $A_1$, thereby moving the proximal end portion 5421 of the first cable 5420 in a direction JJ, as shown in FIG. 10. Rotation of the capstan assembly 5710 about the first axis $A_1$, also causes the drive gear 5712 to rotate. The drive gear 5712 is engaged with the driven gear 5743 and thus the transfer member 5742 rotates about the second axis $A_2$, as shown by the arrow KK. Rotation of the transfer member 5742 causes the drum portion 5744 to rotate about the second axis $A_2$, thereby moving the proximal end portion 5431 of the second cable 5430 in a direction LL.

Because the size of the drive gear 5712 is different than the size of the driven gear 5743, the rotational speed of the transfer member 5742 will be different from that of the capstan assembly 5710. Similarly stated, the gear ratio between the drive gear 5712 and the driven gear 5743 can cause a difference between the rotational speed of the transfer member 5742 and the capstan assembly 5710. For example, if the gear ratio is 2:1 (i.e., the drive gear 5712 is twice the size of the driven gear 5743) then the transfer member 5742 will have twice the rotational speed than the capstan assembly 5710. If, however, the gear ratio is 1:1 (i.e., if the gears have the same size), then the rotational speed of the transfer member 5742 will be the same as that of the capstan assembly 5710. Moreover, the speed (and distance) through which the first cable 5420 moves is a function of the size (e.g., radius) of the first drive member 5711 and the speed (and distance) through which the second cable 5430 moves is a function of the size of the drum portion 5744 of the transfer member 5742. Thus, the speed and distance of the first cable 5420 is different than the speed and distance of the second cable 5430.

Although the proximal end portion 5421 of the first cable 5420 is shown as exiting the first drive member 5711 in a first direction and the proximal end portion 5431 of the second cable 5430 is shown as exiting the drum portion 5744 in a second, opposite direction, in other embodiments, the first cable 5420 and the second cable 5430 can exit in any suitable direction. For example, in other embodiments, the first cable 5420 and the second cable 5430 can exit in the same direction. In yet other embodiments, the first cable 5420 and the second cable 5430 can exit in directions that are normal to each other (i.e., 90 degrees apart).

Figure 11:
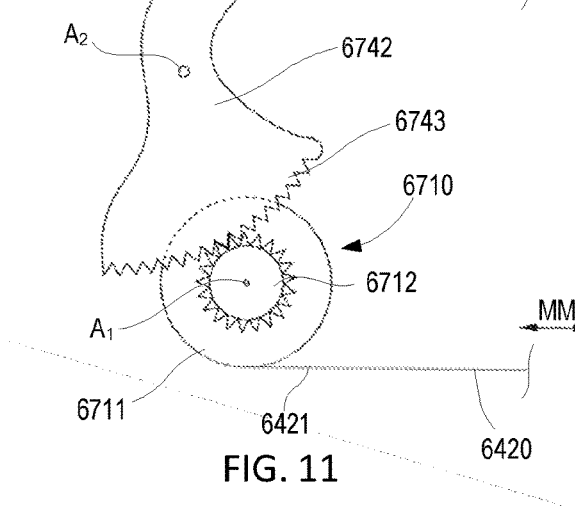
FIG. 11 is a front view of a capstan assembly of a medical instrument including a cable drum and drive gear, according to an embodiment.
Figure 12:
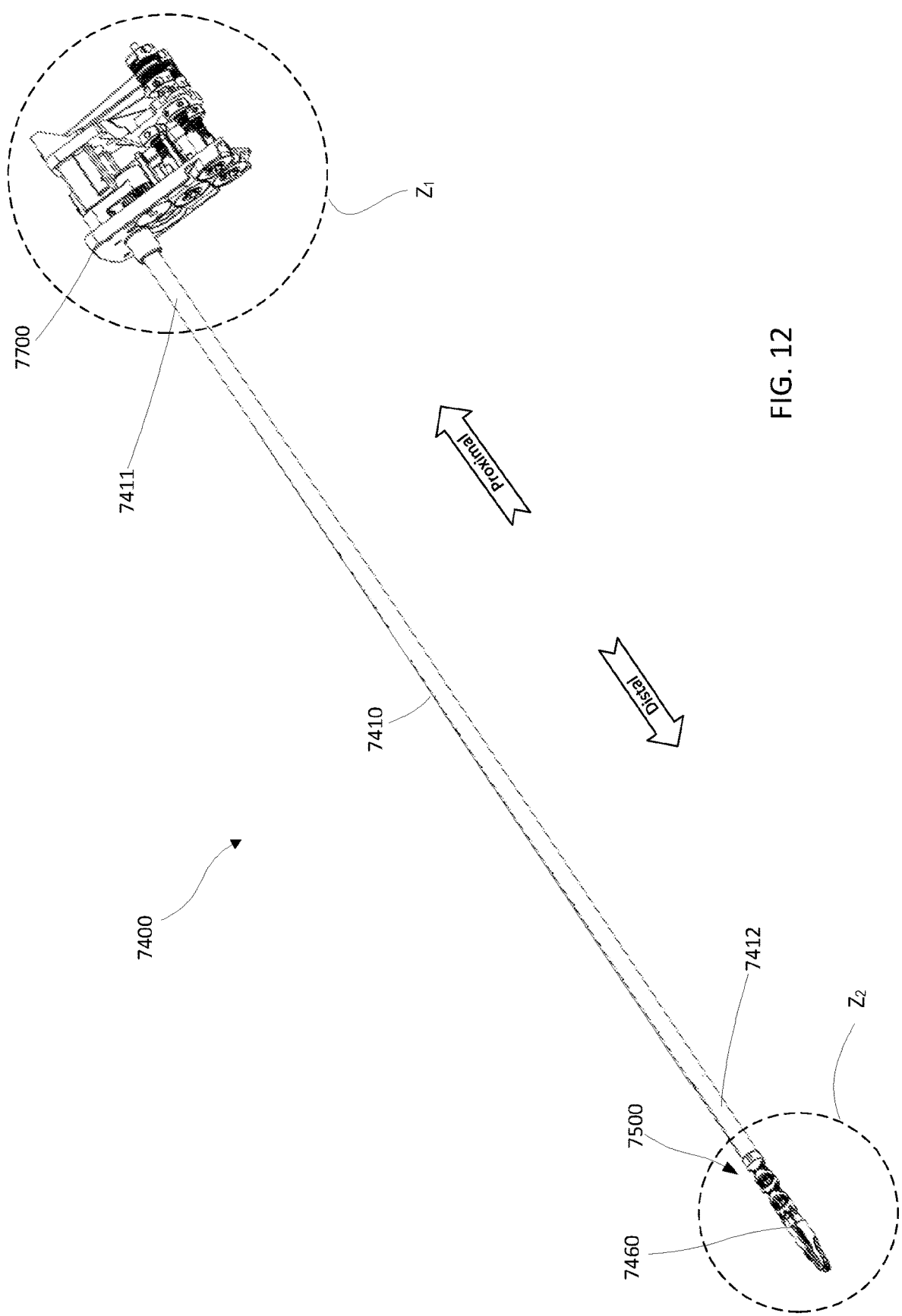
FIG. 12 is a perspective view of a medical instrument, according to an embodiment.
Figure 13:
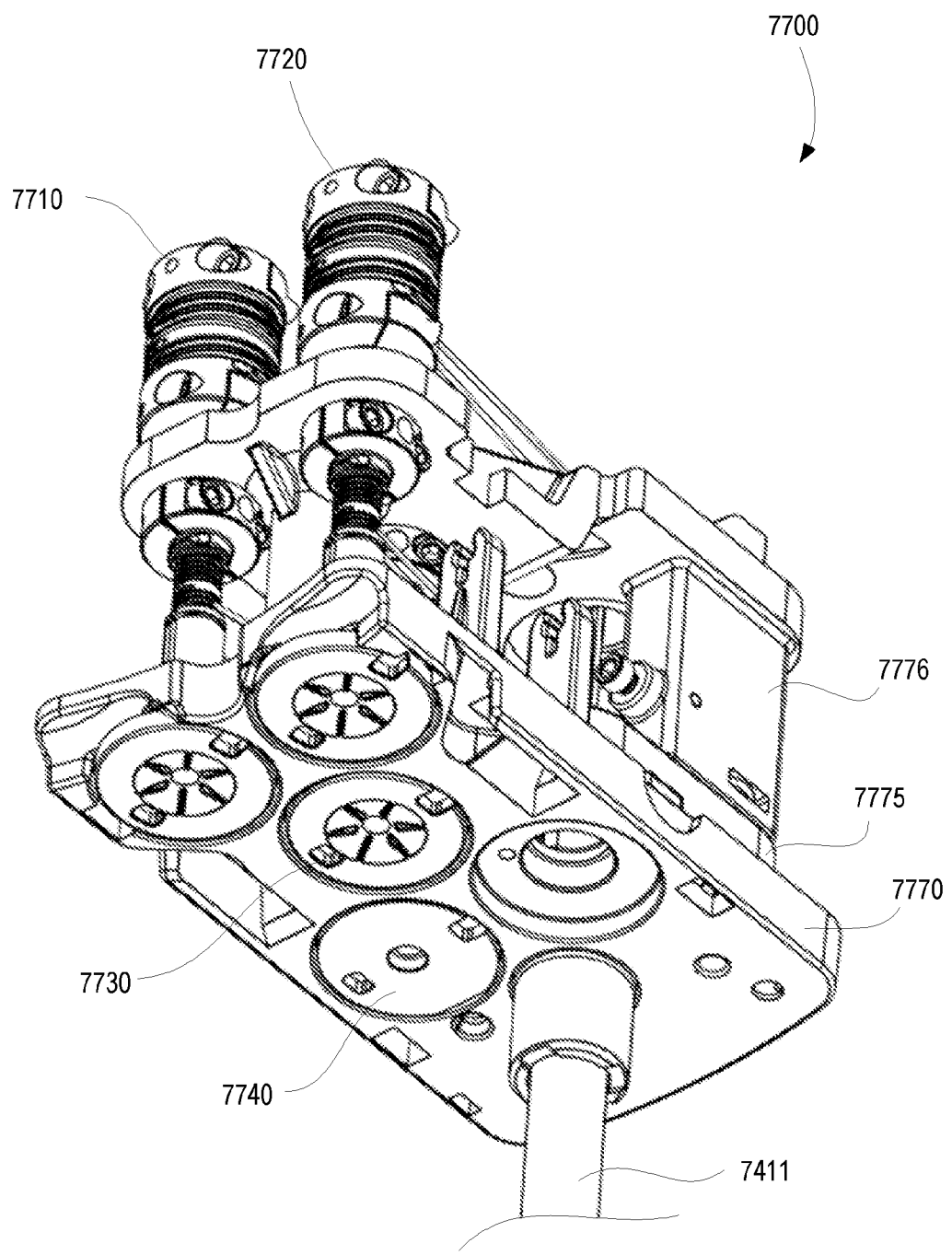
FIGS. 13 and 14 are enlarged perspective views of the mechanical structure shown in region $Z_1$ of FIG. 12 from a distal perspective (FIG. 13) and a proximal perspective (FIG. 14).
Figure 14:
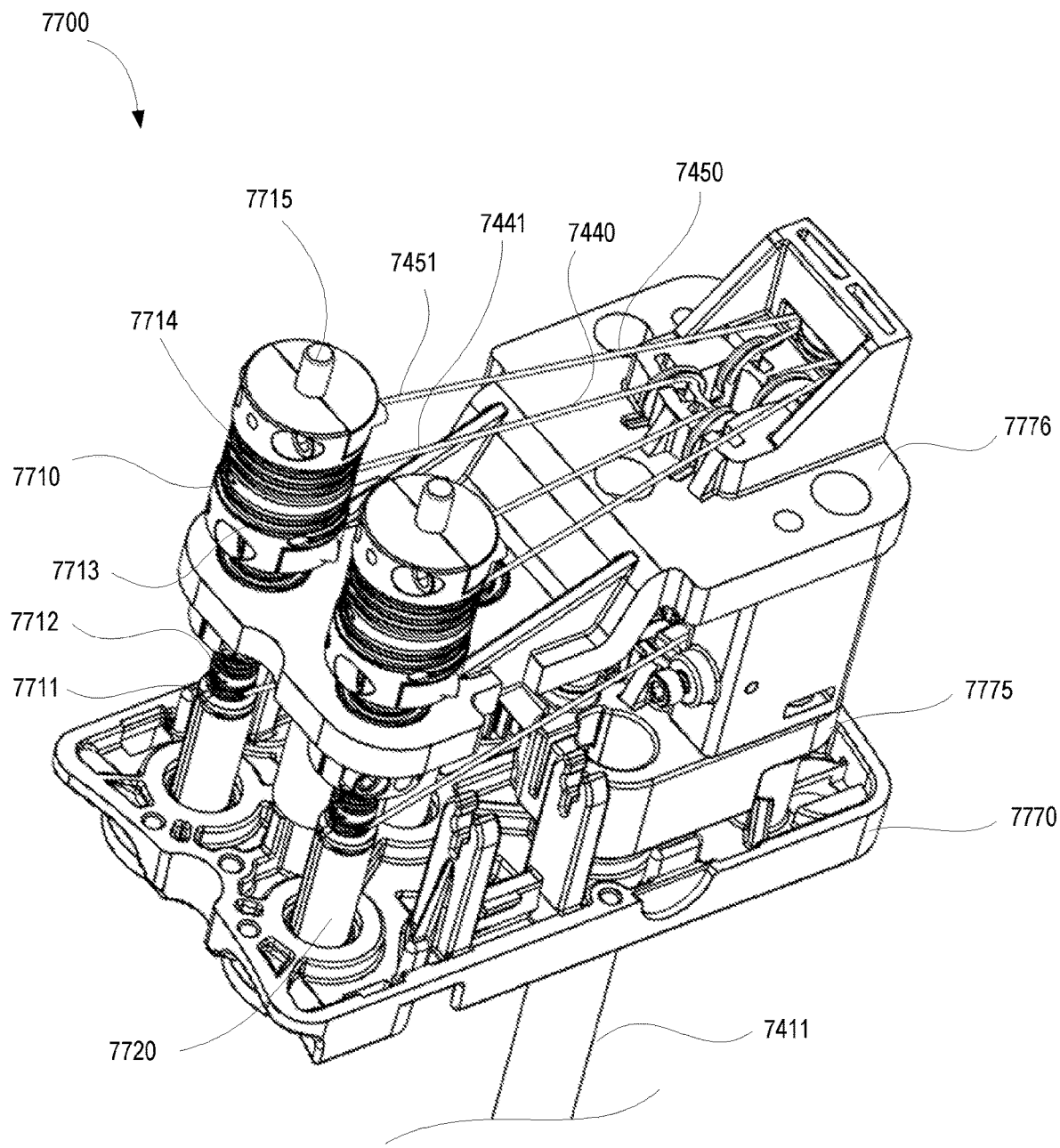

Although the transfer member 5742 is shown as being cylindrical or including a cylindrical driven gear 5743, in other embodiments, any of the mechanical structures described herein can include any suitable transfer member such that a capstan assembly (or mechanical structure) can move multiple cables through different distances or at different speeds with one rotary input. For example, in some embodiments, a transfer member can be a lever that pushes or pulls a cable and does not include a cable drum about which the cable is wrapped. In some embodiments, a transfer member can include a sector gear (i.e., a gear that has teeth only along a portion its circumference). For example, FIG. 11 is a side view schematic illustration of a portion of a mechanical structure 6700, according to an embodiment. The mechanical structure 6700 includes a capstan assembly 6710 and a transfer member 6742 that drive a first cable 6420 and a second cable 6430 with a single input. The mechanical structure 6700 and any of its components (e.g., the capstan assembly 6710 and the transfer member 6742) can be included in any of the mechanical structures or medical instruments described herein.

The capstan assembly 6710 includes an input disc (not shown, but which can be similar to the input disc 5760 described above), a first drive member 6711, and a second drive member 6712. The capstan assembly 6710 also defines a first axis $A_1$ about which the capstan assembly 6710 rotates. Thus, when the mechanical structure is coupled within a surgical system (not shown), the input disc engages an actuator (not shown). The actuator can produce a rotary input into the input disc 6760 to rotate the capstan assembly 6710 about the first axis $A_1$. The first drive member 6711 is a cable drum having a first size (e.g., radius) that is coupled to the proximal end portion 6721 of the first cable 6420. The second drive member 6712 is a drive gear having a second radius (or size) that, as described below, is indirectly coupled to the proximal end portion 6731 of the second cable 6430.

The transfer member 6742 is a lever that includes a sector gear 6743 and a connection portion 6744. The transfer member 6742 rotates about a second axis $A_2$, which can be defined as a pin connection within the mechanical structure. The connection portion 6744 of the transfer member 6742 is coupled to the proximal end portion 6731 of the second cable 6430. The sector gear 6743 is engaged with the drive gear 6712 of the capstan assembly 6710. Thus, rotational movement of the capstan assembly 6710 causes the first cable 6420 and the second cable 6430 to move thereby operating a wrist (not shown). Specifically, rotation of the capstan assembly 6710 about the first axis $A_1$, causes the cable drum 6711 to rotate about the first axis $A_1$, thereby moving the proximal end portion 6421 of the first cable 6420 in a direction MM, as shown in FIG. 11. Rotation of the capstan assembly 6710 about the first axis $A_1$, also causes the drive gear 6712 to rotate. The drive gear 6712 is engaged with the sector gear 6743 and thus the transfer member 6742 rotates about the second axis $A_2$. Rotation of the transfer member 6742 causes the connection portion 6744 to rotate about the second axis $A_2$, thereby moving the proximal end portion 6431 of the second cable 6430 in a direction NN.

Because the size of the drive gear 6712 is different than the size of the sector gear 6743, the rotational speed of the transfer member 6742 will be different from that of the capstan assembly 6710. Similarly stated, the gear ratio between the drive gear 6712 and the driven gear 6743 can cause a difference between the rotational speed of the transfer member 6742 and the capstan assembly 6710. For example, if the gear ratio is 1:3 (i.e., the drive gear 6712 is three times smaller than the size of the sector gear 6743) then the capstan assembly 6710 will have three times the rotational speed than the transfer member 6742. Moreover, the speed (and distance) through which the first cable 6420 moves is a function of the size (e.g., radius) of the first drive member 6711 and the speed (and distance) through which the second cable 6430 moves is a function of the size (i.e., the lever arm distance between the connection portion 6744 and the second axis $A_2$. Thus, the speed and distance of the first cable 6420 is different than the speed and distance of the second cable 6430.

Figure 17:
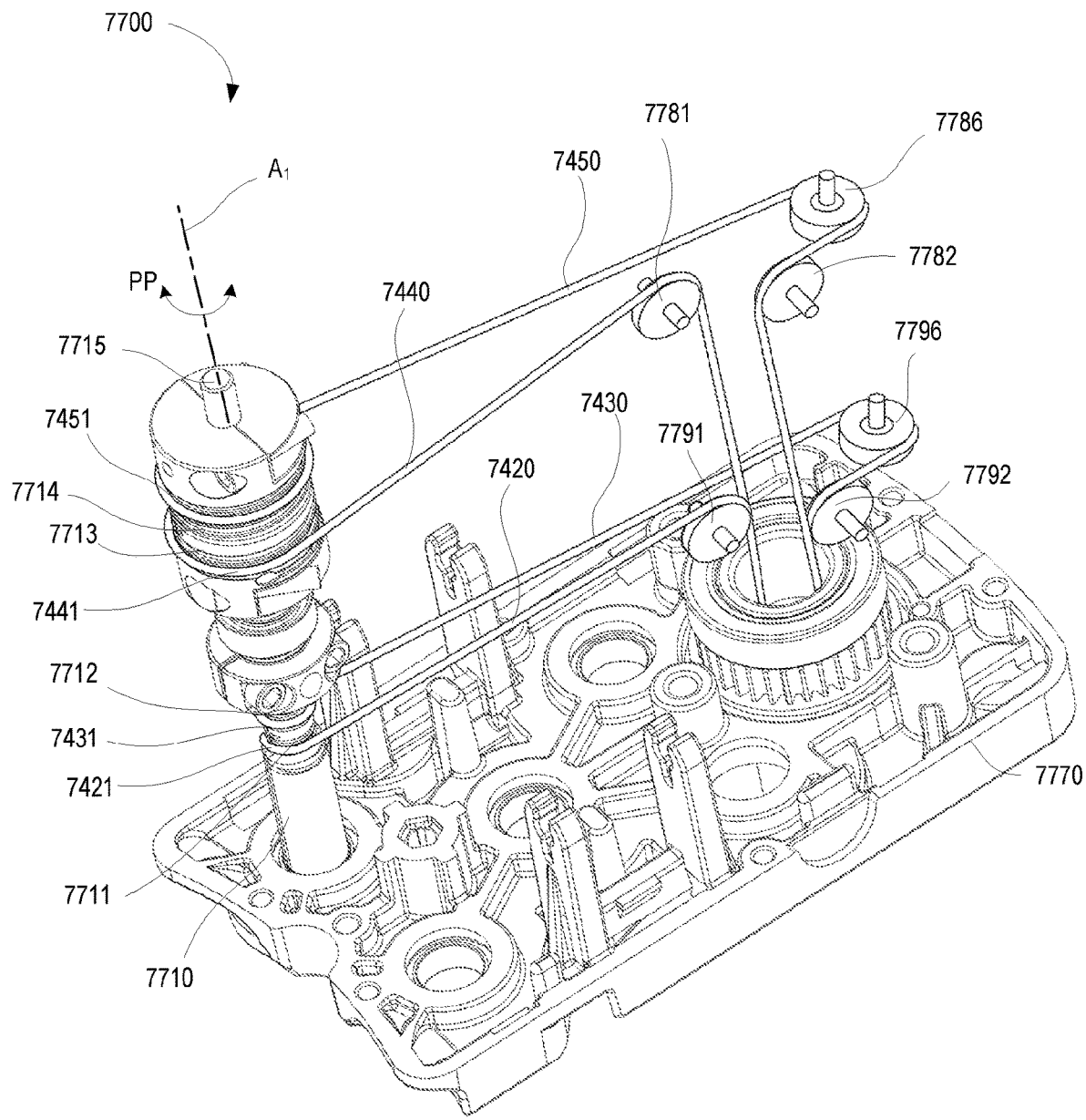
FIG. 17 is a proximal perspective view of the mechanical structure shown in FIGS. 13 and 14 with additional components removed to more clearly show a capstan assembly according to an embodiment.

FIGS. 12-34 are various views of an instrument 7400, according to an embodiment. In some embodiments, the instrument 7400 or any of the components therein are optionally parts of a surgical system that performs surgical procedures, and which can include a manipulator unit, a series of kinematic linkages, a series of cannulas, or the like. The instrument 7400 (and any of the instruments described herein) can be used in any suitable surgical system, such as the MIRS system 1000 shown and described above. The instrument 7400 includes a mechanical structure 7700, a shaft 7410, a wrist assembly 7500, an end effector 7460 and set of cables. The set of cables includes eight cables that couple the mechanical structure 7700 to the wrist assembly 7500. For clarity, only four of the eight cables are identified and described herein (see e.g., FIG. 17 showing the first cable 7420, the second cable 7430, the third cable 7440, and the fourth cable 7450). The set of cables also includes two cables that couple the mechanical structure 7700 to the end effector 7460 (see e.g., FIGS. 26 and 28 showing the fifth cable 7455 and the sixth cable 7456). The instrument 7400 is configured such that movement of the first cable 7420, the second cable 7430, the third cable 7440, and the fourth cable 7450 produces rotation of the links within the wrist assembly 7500 (i.e., pitch rotation) about a first pitch axis of rotation $A_{P1}$ and a second pitch axis of rotation $A_{P2}$ (see FIG. 25, the term pitch is arbitrary), rotation of the links within the wrist assembly 7500 (i.e., yaw rotation) about a first yaw axis of rotation $A_{Y1}$ and a second yaw axis of rotation $A_{Y2}$ (see FIGS. 26 and 27, the term yaw is arbitrary), or any combination of these movements. Movement of the fifth cable 7455 and the sixth cable 7456 produces actuation of the end effector 7460 (e.g., a grip, a cutting rotation, or a suture arm movement). Although the end effector 7460 is shown as being a needle driver that functions as a mechanism for suturing, in other embodiments, the instrument 7400 can include any suitable end effector, such as a cutting tool, a cautery instrument, a gripper, or the like.

The first cable 7420 includes a proximal end portion 7421 and a distal end portion 7422, the second cable 7430 includes a proximal end portion 7431 and a distal end portion 7432, the third cable 7440 includes a proximal end portion 7441 and a distal end portion 7442, and the fourth cable 7450 includes a proximal end portion 7451 and a distal end portion 7452. The proximal end portions of the cables are coupled within the mechanical structure 7700 (see, e.g., FIGS. 14-17) and the distal end portions of the cables are coupled to the wrist assembly 7500 (see, e.g., FIGS. 25-28). The fifth cable 7455 and the sixth cable 7456 also each have a proximal end portion (not identified) coupled within the mechanical structure and a distal end portion (not identified)

coupled to the end effector 7460. The cables can be formed from any suitable materials. For example, in some embodiments, any of the cables described herein can be formed from tungsten strands. In other embodiments, any of the cables described herein can be formed from an ultra-high molecular weight polyethylene (UHMWPE) fiber.

The shaft 7410 can be any suitable elongated shaft that couples the wrist assembly 7500 to the mechanical structure 7700. Specifically, the shaft 7410 includes a proximal end 7411 that is coupled to the mechanical structure 7700, and a distal end 7412 that is coupled to the wrist assembly 7500 (e.g., a first link 7510 of the wrist assembly 7500). The shaft 7410 defines a lumen (not shown) or multiple passageways through which the cables and other components (e.g., electrical wires, ground wires, or the like) can be routed from the mechanical structure 7700 to the wrist assembly 7500.

Figure 20:
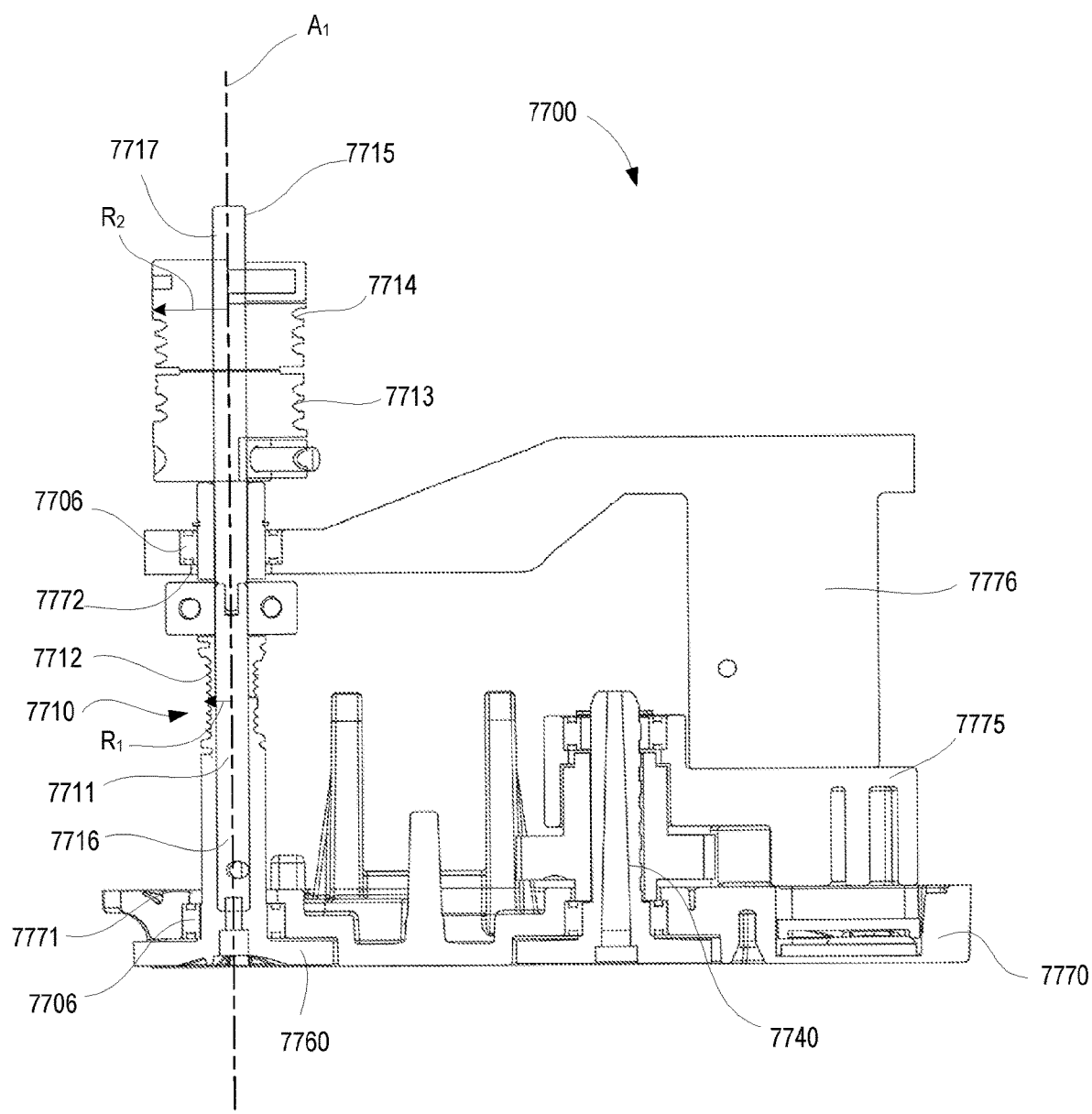
FIG. 20 is a cross-sectional view of the mechanical structure shown in FIGS. 13 and 14 to show the capstan assembly shown in FIG. 17.

The mechanical structure 7700 includes a chassis 7770 (which functions as a base), a first mounting bracket 7775, a second mounting bracket 7776, and a set of capstans rotatably mounted to the chassis. The chassis 7770, the first mounting bracket 7775, and the second mounting bracket 7776 provide structural support for mounting and aligning components (e.g., the capstans) in the mechanical structure 7700. For example, the chassis 7770 defines a shaft opening within which the proximal end 7411 of the shaft 7410 is mounted. As shown in FIG. 20, the chassis 7770 further defines one or more openings 7771 within which the capstans are mounted and rotatably supported via bearings 7706. The second mounting bracket 7776 also includes one more openings 7772 within which the capstans are mounted (and are also rotatably supported via bearings 7706). The openings 7771 of the chassis 7770 are axially aligned with the openings 7772 of the second mounting bracket 7776. In addition to providing mounting support for the internal components of the mechanical structure 7700, the chassis 7770 can include external features (e.g., recesses, clips, etc.) that interface with a docking port of a drive device (not shown). The drive device can be, for example, a handheld system or a computer-assisted teleoperated system that can receive the instrument 7400 and manipulate the instrument 7400 to perform various surgical operations. The drive device can include one or more motors to drive the capstans of the mechanical structure 7700. In other embodiments, the drive device can be an assembly that can receive and manipulate the instrument 7400 to perform various operations. In some embodiments, the mechanical structure 7700 includes a cover (not shown) that is attached to the chassis 7770. The cover can partially enclose or fully enclose components disposed within the mechanical structure 7700.

The mechanical structure 7700 includes a first capstan assembly 7710 a second capstan assembly 7720, a third capstan assembly 7730, and a roll drive assembly 7740. As described herein, the first capstan assembly 7710 and the second capstan assembly 7720 are each configured to move four cables coupled to the wrist assembly to operate the wrist assembly 2500 (e.g., to rotate the various links of the wrist assembly about the pitch axes, the yaw axes, or a combination of both the pitch axes and the yaw axes). Thus, the wrist assembly 7500 can be referred to as an eight-cable wrist. Specifically, the first capstan assembly 7710 is configured to move the first cable 7420, the second cable 7430, the third cable 7440, and the fourth cable 7450, as described in detail herein. Because the structure and function of the second capstan assembly 7720 is similar to that of the first capstan assembly 7710, it is not described separately. The third capstan assembly 7730 is configured to move the fifth cable 7455 and the sixth cable 7456 to operate the end effector 7460. The roll drive assembly 7740 is configured to rotate the shaft 7410 about its center line (which functions as a roll axis; the term roll is arbitrary).

Figure 22:
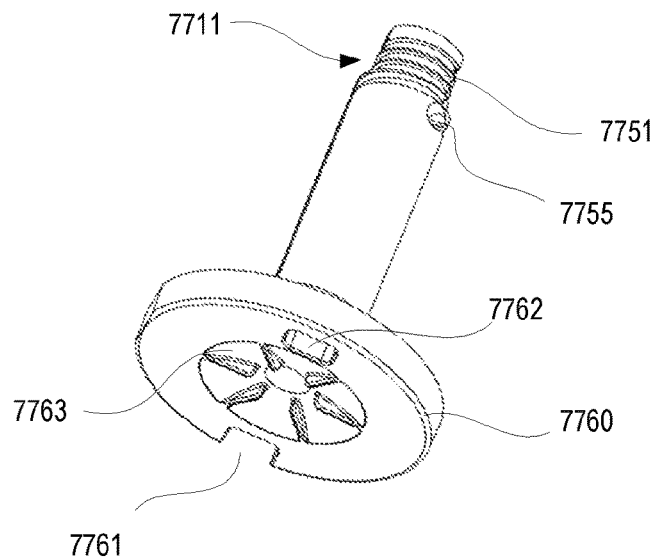
FIG. 22 is a perspective view of the input disc and first cable drum of the capstan assembly shown in FIG. 17.
Figure 23:
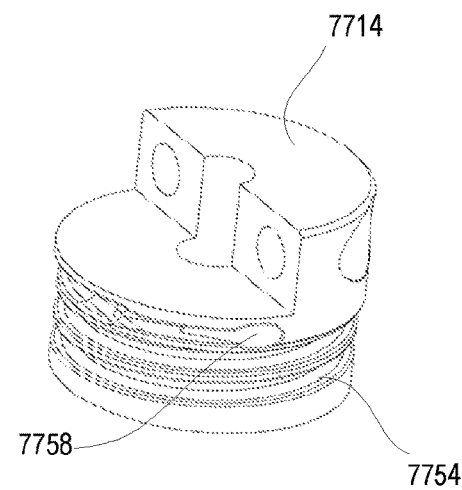
FIG. 23 is a perspective view of the fourth cable drum of the capstan assembly shown in FIG. 17.
Figure 24:
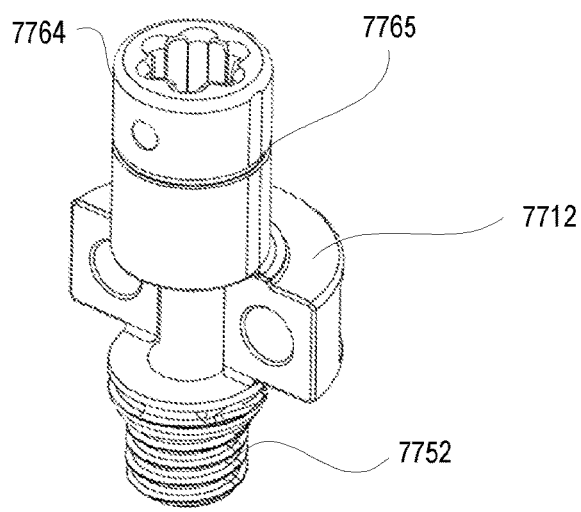
FIG. 24 is a perspective view of the second cable drum of the capstan assembly shown in FIG. 17.

The first capstan assembly 7710 includes a shaft 7715 that defines a capstan axis $A_1$, an input disc 7760, a first cable drum 7711, a second cable drum 7712, a third cable drum 7713, and a fourth cable drum 7714. As shown in FIG. 17, the first cable drum 7711 functions as a first drive member to move the proximal end portion 7421 of the first cable 7420 when the capstan assembly 7710 rotates about the capstan axis $A_1$, as shown by the arrow PP. As shown in FIG. 22, the input disc 7760 defines a first drive dog receptacle 7761 and a second drive dog receptacle 7761. The input disc 7760 also includes a set of protrusions 7763. When the instrument 7400 is coupled within a surgical system, an actuator (not shown) can engage the input disc 7760 to provide rotary input to the first capstan assembly 7710. Specifically, drive dogs of the actuator can matingly fit within the drive dog receptacles 7761, 7762 to transmit torque from the actuator to rotate the first capstan assembly 7710 about the capstan axis $A_1$. The protrusions 7763 can be used to manually rotate the capstan assembly 7710.

Figures 18, 19:
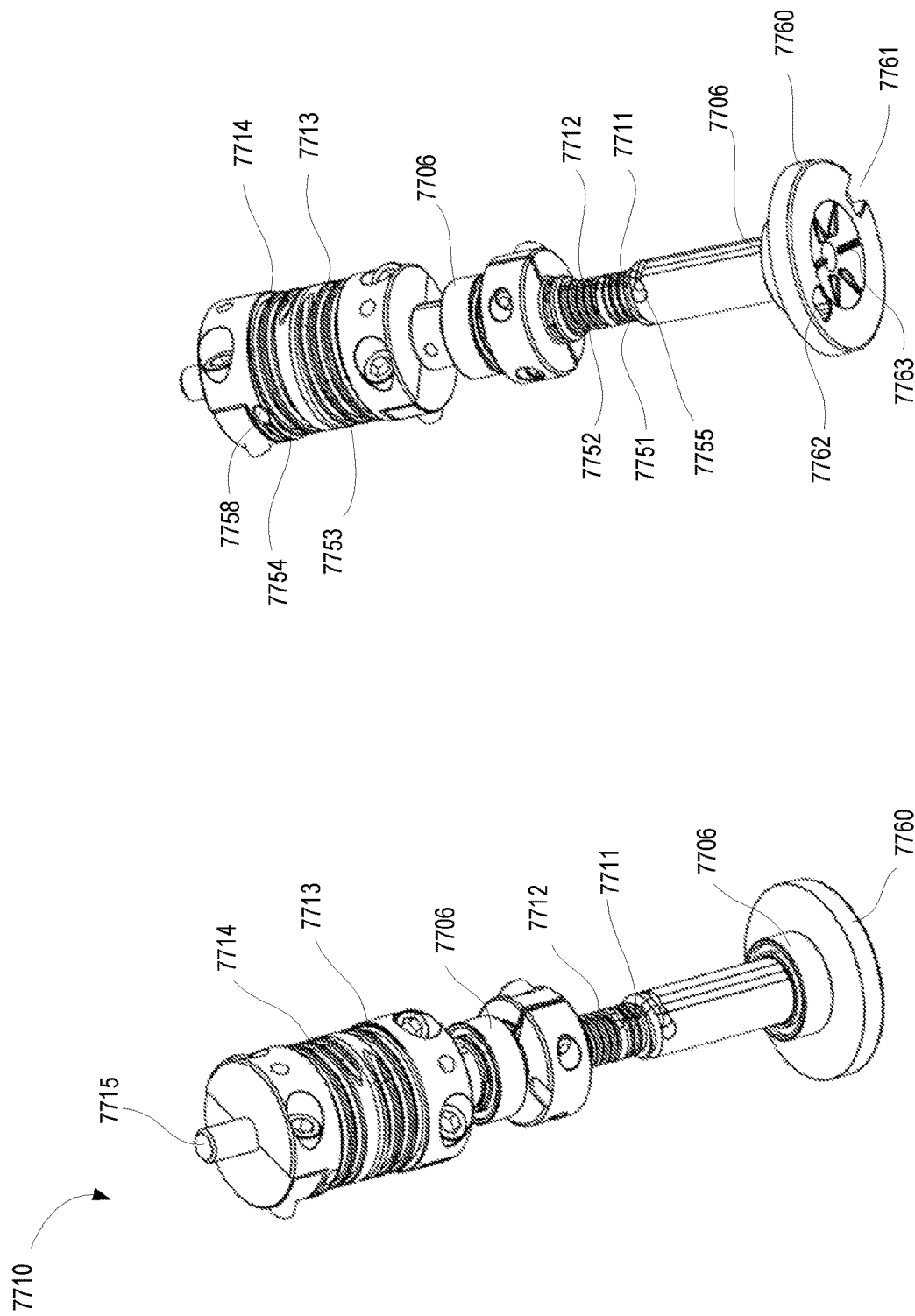
FIGS. 18 and 19 are perspective views of the capstan assembly shown in FIG. 17.
Figure 21:
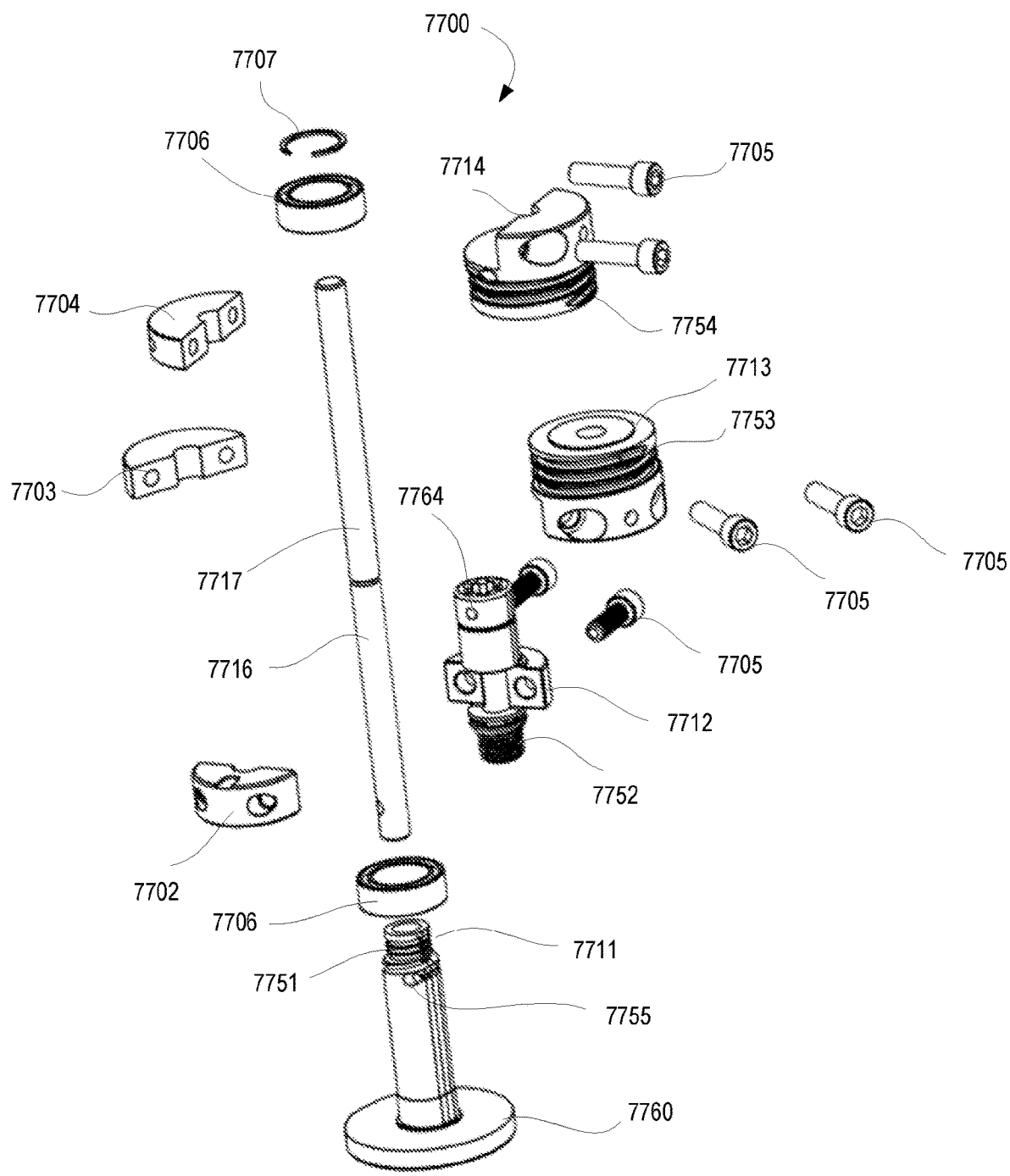
FIG. 21 is an exploded view of the capstan assembly shown in FIG. 17.

As shown in FIGS. 20 and 21, the first cable drum 7711 is coupled to the input disc 7760 and is fixedly coupled to a lower shaft member 7716 of the shaft 7715. In some embodiments, the first cable drum 7711 and the input disc 7760 can be monolithically constructed. In other embodiments, the first cable drum 7711 and the input disc 7760 can be constructed separately and later coupled to the lower shaft member 7716. Referring to FIGS. 18 and 19, the first cable drum 7711 includes a first set of cable winding grooves 7751 that terminate in a first connection opening 7755. The proximal end portion 7421 of the first cable 7420 is wrapped about the first cable drum 7711 within the cable winding grooves 7751 and is coupled to the first cable drum 7711 by a crimp or connection portion (not shown) that is secured within the first connection opening 7755.

The second cable drum 7712 functions as a second drive member to move the proximal end portion 7431 of the second cable 7430 when the capstan assembly 7710 rotates about the capstan axis $A_1$. As shown in FIGS. 20 and 21, the second cable drum 7712 is fixedly coupled to the lower shaft member 7716 of the shaft 7715 by a second clamp 7702 (which is secured with two screws 7705). The second cable drum 7712 includes a shaft connection portion 7764 defining a snap-ring groove 7765. The shaft connection portion 7764 receives and is coupled to the upper shaft member 7717. In this manner, the second cable drum 7712 is coupled to and secures together both of the lower shaft member 7716 and the upper shaft member 7717. In other embodiments, the shaft 7715 need not be constructed from two pieces, but instead can be a single piece. The second cable drum 7712 is rotatably supported in the second mounting bracket 7776 by a bearing 7706 that is secured by a snap-ring 7707 (see FIG. 21). Referring to FIGS. 18 and 19, the second cable drum 7712 includes a second set of cable winding grooves 7752 that terminate in a second connection opening (not shown, but which can be similar to the first connection opening 7755). The proximal end portion 7431 of the second cable 7430 is wrapped about the second cable drum 7712 within the cable winding grooves 7752 and is coupled to the second cable drum 7712 by a crimp or connection portion (not shown) that is secured within the second connection opening.

As shown in FIG. 17, the proximal end portion 7421 of the first cable 7420 is wrapped about a first side (or in a first wrap direction) of the first cable drum 7711 and the proximal end portion 7431 of the second cable 7430 is wrapped about a second, opposite side (or in a second, opposite wrap direction) of the second cable drum 7712. In this manner, rotation of the capstan assembly 7710 about the capstan axis $A_1$, moves the first cable 7420 in a first direction and the second cable 7430 in a second, opposite direction. This causes the first cable 7420 to be pulling in while the second cable 7430 is paying out, or vice-versa. Moreover, as shown in FIG. 20, the first cable drum 7711 and the second cable drum 7712 each have a first radius $R_1$. Thus, rotation of the capstan assembly 7710 at a specific angular speed causes the proximal end portion 7421 of the first cable 7420 and the proximal end portion 7431 of the second cable 7430 to move through the same distance and at the same linear speed. This arrangement can facilitate maintaining the desired tension in the first cable 7420 and the second cable 7430 to prevent slack in the cables from derailing and to prevent excessive tension in the cables from deforming or damaging other components. This is sometimes referred to as cable length conservation.

The second cable drum 7712 is coupled to the shaft 7715 independently from the first cable drum 7711. This can allow the angular position of the second cable drum 7712 on the shaft 7715 to be adjusted relative to the angular position of the first cable drum 7711 on the shaft 7715 during assembly of the instrument 7400. Specifically, during assembly, the first cable 7420 can be routed from the wrist assembly 7500 and coupled to the first cable drum 7711. The first cable drum 7711 and/or the lower shaft member 7716 can be rotated to adjust the tension in the first cable 7420 to the desired amount. With the first cable drum 7711 in a fixed position, the second cable 7430 can be routed from the wrist assembly 7500 and coupled to the second cable drum 7712. The second cable drum 7712 can be rotated relative to the first cable drum 7711 and the lower shaft member 7716 to adjust the tension in the second cable 7430 to the desired amount. The second cable drum 7712 can then be fixed to the lower shaft member 7716 by the second clamp 7702 to maintain the cable tension.

The third cable drum 7713 functions as a third drive member to move the proximal end portion 7441 of the third cable 7440 when the capstan assembly 7710 rotates about the capstan axis $A_1$. As shown in FIGS. 20 and 21, the third cable drum 7713 is fixedly coupled to the upper shaft member 7717 of the shaft 7715 by a third clamp 7703 (which is secured with two screws 7705). The third cable drum 7713 is coupled to the shaft 7715 independently from the first cable drum 7711 and the second cable drum 7712. This can allow the angular position of the third cable drum 7713 on the shaft 7715 to be adjusted relative to the angular position of the first cable drum 7711 and the second cable drum 7712 during assembly of the instrument 7400, in a similar manner as described above. Referring to FIGS. 18 and 19, the third cable drum 7713 includes a third set of cable winding grooves 7753 that terminate in a third connection opening (not shown, but which can be similar to the first connection opening 7755). The proximal end portion 7441 of the third cable 7440 is wrapped about the third cable drum 7713 within the cable winding grooves 7753 and is coupled to the third cable drum 7713 by a crimp or connection portion (not shown) that is secured within the second connection opening.

The fourth cable drum 7714 functions as a fourth drive member to move the proximal end portion 7451 of the fourth cable 7450 when the capstan assembly 7710 rotates about the capstan axis $A_1$. As shown in FIGS. 20 and 21, the fourth cable drum 7714 is fixedly coupled to the upper shaft member 7717 of the shaft 7715 by a fourth clamp 7704 (which is secured with two screws 7705). The fourth cable drum 7714 is coupled to the shaft 7715 independently from the first cable drum 7711, the second cable drum 7712, and the third cable drum 7713. This can allow the angular position of the fourth cable drum 7714 on the shaft 7715 to be adjusted relative to the angular position of the third cable drum 7713 (and the other two first cables) during assembly of the instrument 7400, in a similar manner as described above. Referring to FIGS. 18 and 19, the fourth cable drum 7714 includes a fourth set of cable winding grooves 7754 that terminate in a fourth connection opening 7758. The proximal end portion 7451 of the fourth cable 7450 is wrapped about the fourth cable drum 7714 within the cable winding grooves 7754 and is coupled to the fourth cable drum 7714 by a crimp or connection portion (not shown) that is secured within the fourth connection opening 7758.

Figure 15:
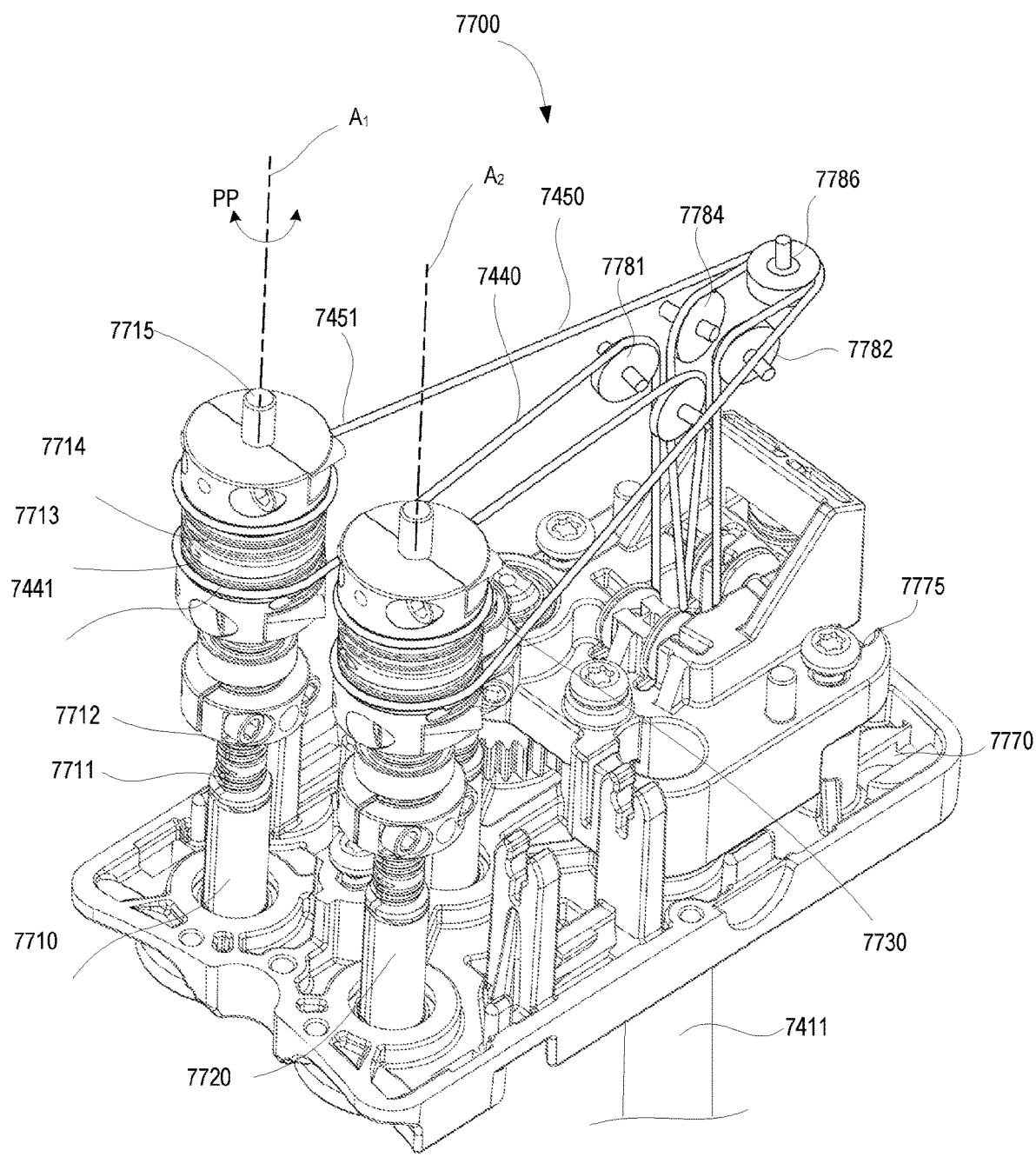
FIG. 15 is a proximal perspective view of the mechanical structure shown in FIGS. 13 and 14 with a first mounting bracket removed to more clearly show internal components.
Figure 16:
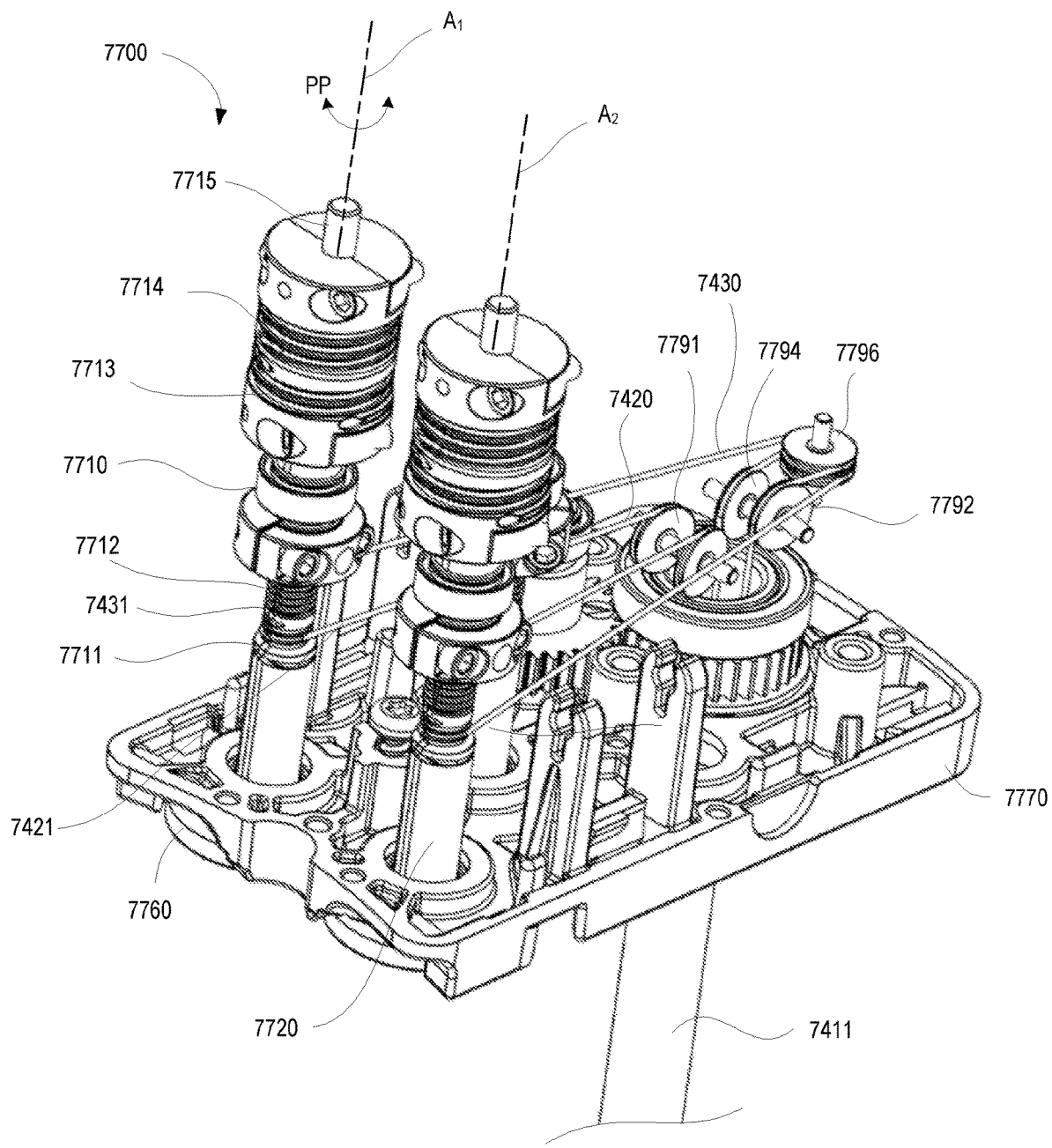
FIG. 16 is a proximal perspective view of the mechanical structure shown in FIGS. 13 and 14 with a second mounting bracket removed to more clearly show internal components.

As shown in FIGS. 15 and 17, the proximal end portion 7441 of the third cable 7440 is wrapped about a first side (or in a first wrap direction) of the third cable drum 7713 and the proximal end portion 7451 of the fourth cable 7450 is wrapped about a second, opposite side (or in a second, opposite wrap direction) of the fourth cable drum 7714. In this manner, rotation of the capstan assembly 7710 about the capstan axis $A_1$, moves the third cable 7440 in a first direction and the fourth cable 7450 in a second, opposite direction. This causes the third cable 7440 to be pulling in while the fourth cable 7450 is paying out, or vice-versa. Moreover, as shown in FIG. 20, the third cable drum 7713 and the fourth cable drum 7714 each have a second radius $R_2$. Thus, rotation of the capstan assembly 7710 at a specific angular speed causes the proximal end portion 7441 of the third cable 7440 and the proximal end portion 7451 of the fourth cable 7450 to move through the same distance and at the same linear speed. This arrangement can facilitate maintaining the desired tension in the third cable 7440 and the fourth cable 7450 to prevent slack in the cables from derailing and to prevent excessive tension in the cables from deforming or damaging other components.

Because the first radius $R_1$ is smaller than the second radius $R_2$, rotation of the capstan assembly 7710 through a specific angular displacement causes the first cable 7420 and the second cable 7730 to move a first distance and the third cable 7440 and the fourth cable 7450 to move a second distance that is greater than the first distance. Similarly, rotation of the capstan assembly 7710 at a specific angular speed causes the first cable 7420 and the second cable 7730 to move at first linear speed and the third cable 7440 and the fourth cable 7450 to move at a second linear speed that is greater than the first speed. The difference between first distance and the second distance (and the first linear speed and the second linear speed) is related to the difference between the first radius $R_1$ and the second radius $R_2$. For example, if the ratio between the second radius $R_2$ and the first radius $R_1$ is 2:1, then the distance through which the third cable 7440 and the fourth cable 7450 move and the linear speed at which the third cable 7440 and the fourth cable 7450 move will be twice that of the first cable 7420 and the second cable 7430.

This arrangement can advantageously allow for the first capstan assembly 7710 to produce different amounts of cable movement or cable speed with a single rotary input. The different characteristics of the cable movement can improve the operation of the wrist 7500. Specifically, as described in more detail below, the first cable 7420 and the second cable 7430 terminate in the third link 7530 of the wrist assembly 7500 and only control the rotation of the second link 7520 (about the first pitch axis $A_{P1}$) and the third link (about the first yaw axis $A_{Y1}$). In contrast, the third cable 7440 and the fourth cable 7450 terminate in the fifth link 7550 of the wrist assembly 7500 and control the rotation of the fourth link 7540 (about the second pitch axis $A_{P2}$) and the fifth link (about the second yaw axis $A_{Y2}$). Because the third cable 7440 and the fourth cable 7450 are routed through all of the links of the wrist assembly 7500, the cable path of the third cable 7440 and the fourth cable 7450 is longer than that of the first cable 7420 and the second cable 7430. Accordingly, when the wrist assembly 7500 is moved from a first (or straight) configuration (FIGS. 25 and 26) to a second (or bent) configuration (FIG. 27), the third cable 7440 and the fourth cable 7450 will be moved a greater distance and at a greater speed than the first cable 7420 and the second cable 7430. The first capstan assembly 7710 can advantageously produce the desired movement of all four cables with a single rotary input, thereby preserving space in the mechanical structure 7700 and allowing the mechanical structure 7700 to be driven by existing interfaces.

The ratio between the second radius $R_2$ and the first radius $R_1$ can be any suitable value (e.g., to accommodate the difference in the cable path lengths between the cables). For example, in some embodiments, the ratio between the second radius $R_2$ and the first radius $R_1$ is between 1.5:1 and 2.5:1. In other embodiments, the ratio between the second radius $R_2$ and the first radius $R_1$ is between 1.5:1 and 2:1. In yet other embodiments, the ratio between the second radius $R_2$ and the first radius $R_1$ is about 1.8:1. Moreover, although the second radius $R_2$ is shown as being larger than the first radius $R_1$, in other embodiments, the second radius $R_2$ can be smaller than the first radius $R_1$. In yet other embodiments, the second radius $R_2$ can be the same size as than the first radius $R_1$. In such embodiments, the cables will move at substantially the same speed, thereby causing the portions of the wrist to rotate at different speeds (or amounts) relative to each other.

The proximal end portions of the cables are routed through the mechanical structure 7700 and into the shaft 7410 by two sets of pulleys. As shown in FIG. 15, the mechanical structure 7700 includes a first set of pulleys supported by the first mounting bracket 7775 that route the proximal end portion 7421 of the first cable 7420 and the proximal end portion 7431 of the second cable 7430 into the shaft 7410. The first set of pulleys is more clearly shown in FIGS. 16 and 17, which show the mechanical structure with the first mounting bracket 7775 and the second mounting bracket 7776 removed for clarity. Specifically, the first set of pulleys includes a first pulley 7791, a second pulley 7792, and a third pulley 7796. The first cable 7420 is routed from the first cable drum 7711, around the first pulley 7791, and into the shaft 7410. The second cable 7430 is routed from the second cable drum 7712, around the third pulley 7796, the second pulley 7792, and into the shaft 7410. Similarly, the mechanical structure 7700 includes a second set of pulleys supported by the second mounting bracket 7776 that route the proximal end portion 7441 of the third cable 7440 and the proximal end portion 7451 of the fourth cable 7450 into the shaft 7410. The first set of pulleys is more clearly shown in FIGS. 15 and 17, which show the mechanical structure with the second mounting bracket 7776 removed for clarity. Specifically, the second set of pulleys includes a fourth pulley 7781, a fifth pulley 7782, and a sixth pulley 7786. The third cable 7440 is routed from the third cable drum 7713, around the fourth pulley 7781, and into the shaft 7410. The fourth cable 7450 is routed from the fourth cable drum 7714, around the sixth pulley 7786, the fifth pulley 7782, and into the shaft 7410. This routing ensures that the cables are routed into the desired position within the shaft 7410 (e.g., relative to a shaft center line). Specifically, the first cable 7420, the second cable 7430, the third cable 7440, and the fourth cable 7450 can be positioned within the shaft spaced apart from the shaft center line and at different radial or circumferential positions within the shaft 7410. This arrangement can reduce the likelihood that the cables will become entangled with (e.g., twisted about) each other within shaft 7410.

Figure 25:
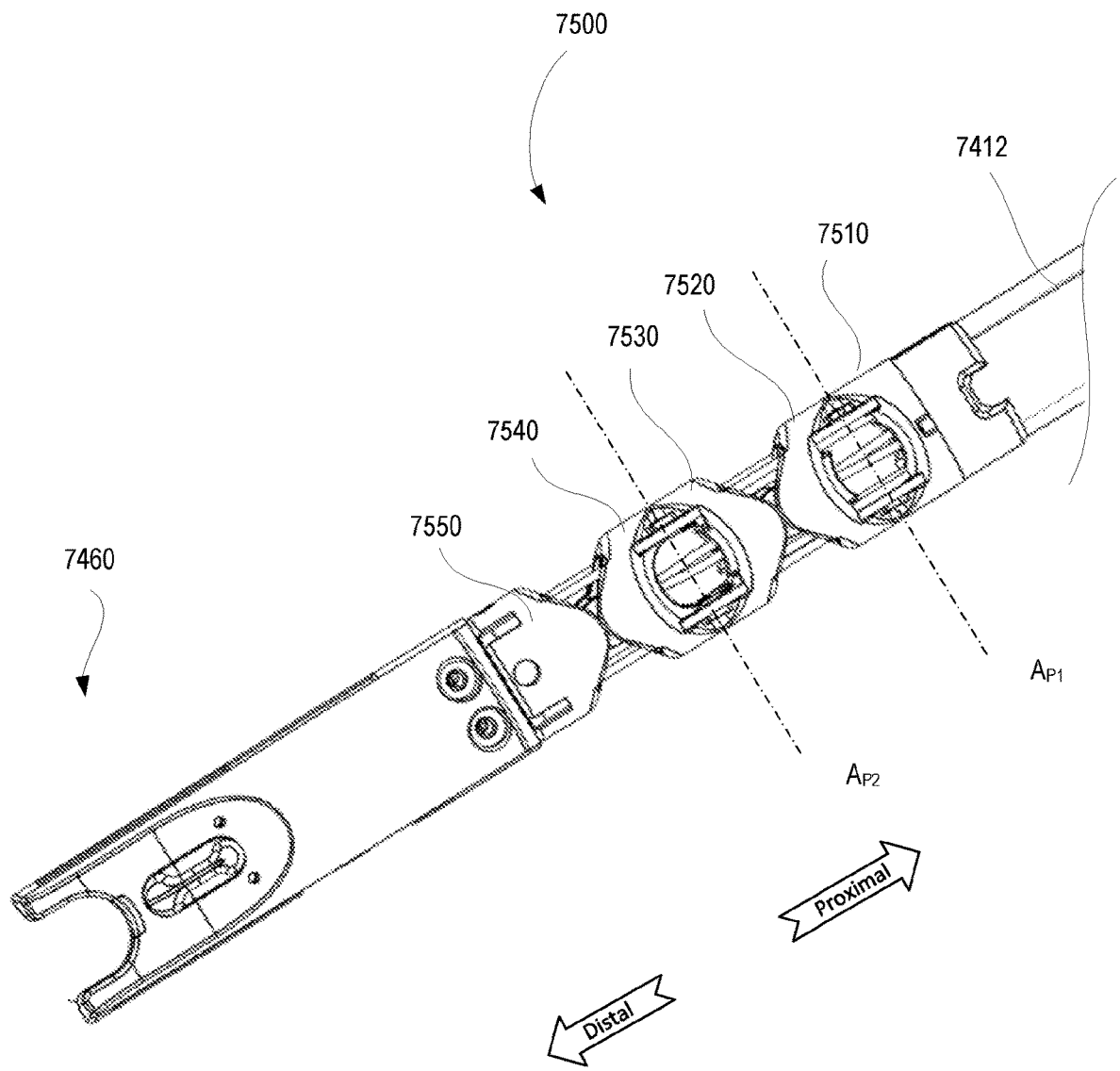
FIG. 25 is an enlarged perspective view of the wrist assembly and end effector shown in region $Z_2$ of FIG. 12.
Figure 26:
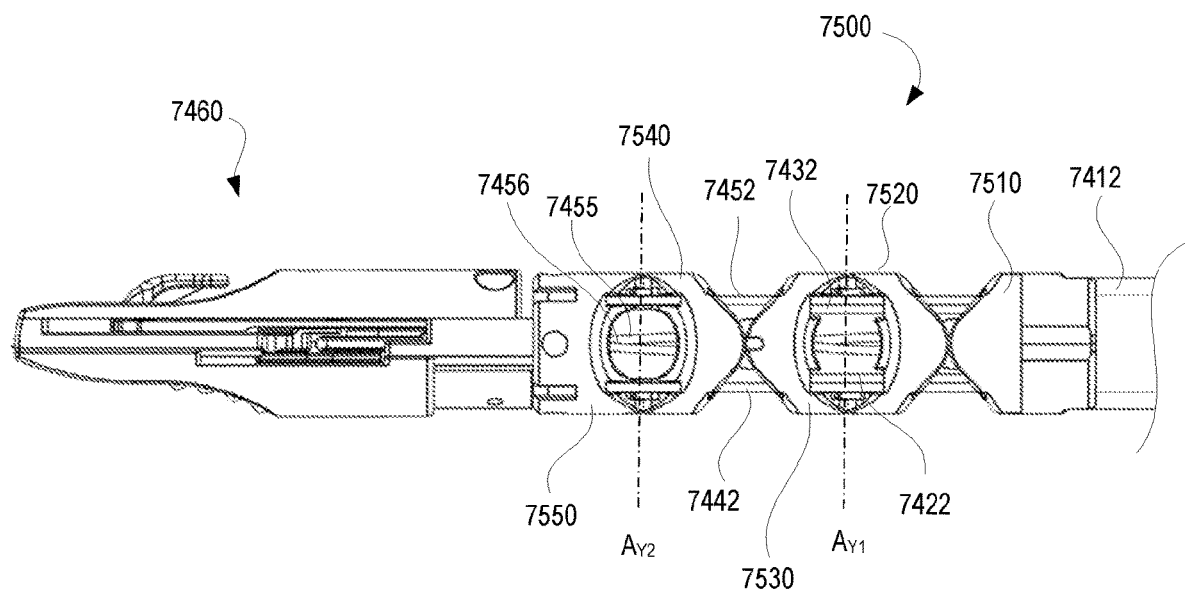
FIGS. 26 and 27 are side views of the wrist assembly shown in FIG. 25 in a first configuration (FIG. 26) and a second configuration (FIG. 27).
Figure 27:
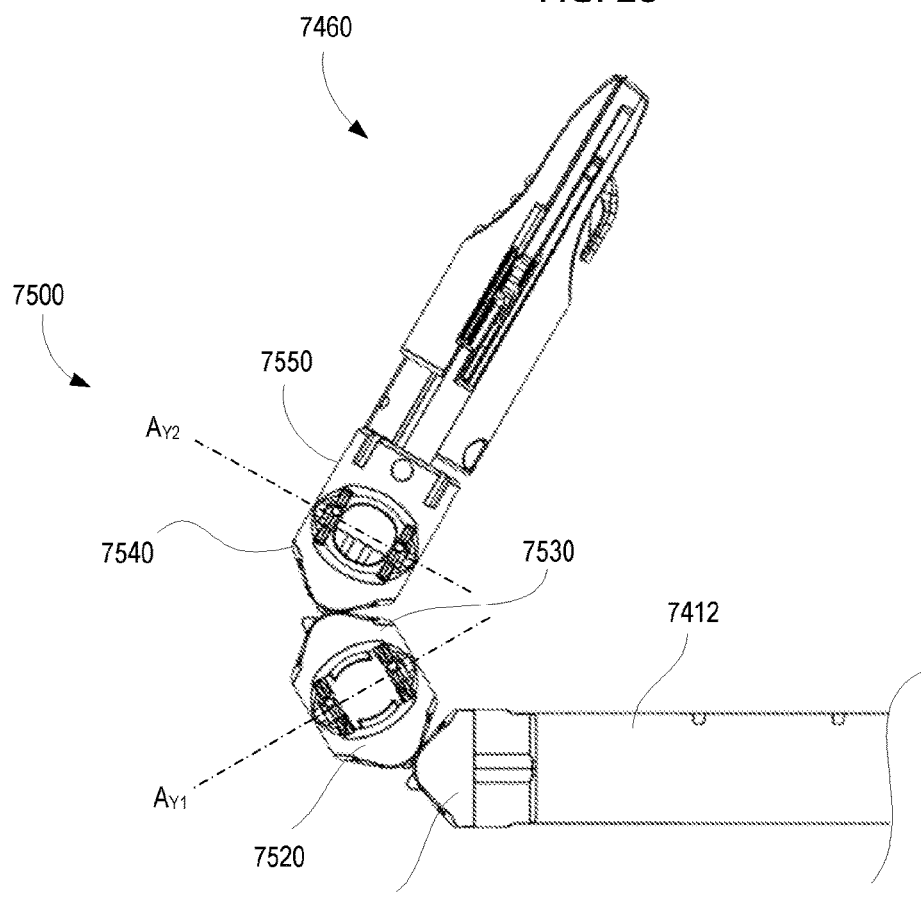
Figure 28:
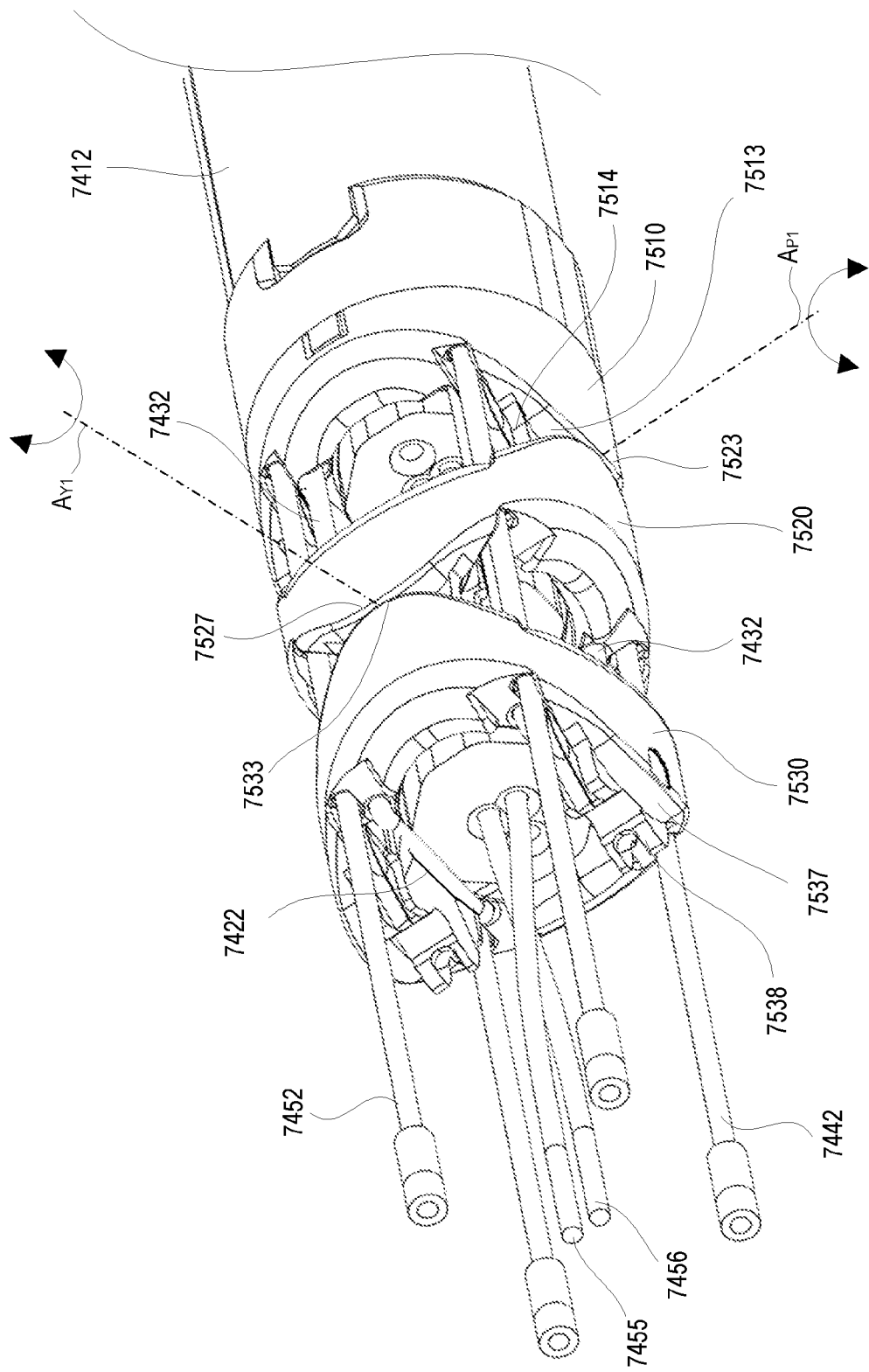
FIG. 28 is a distal perspective view of the wrist assembly shown in FIGS. 25-27 with certain links removed to clearly show the cable routing.
Figure 29:
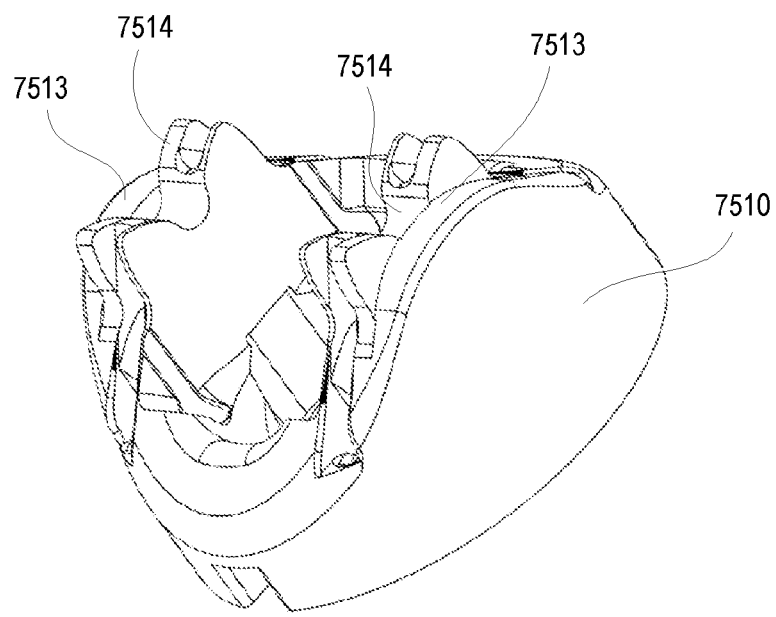
FIGS. 29-30 are perspective views of the first link of the wrist assembly shown in FIGS. 25-27.
Figure 30:
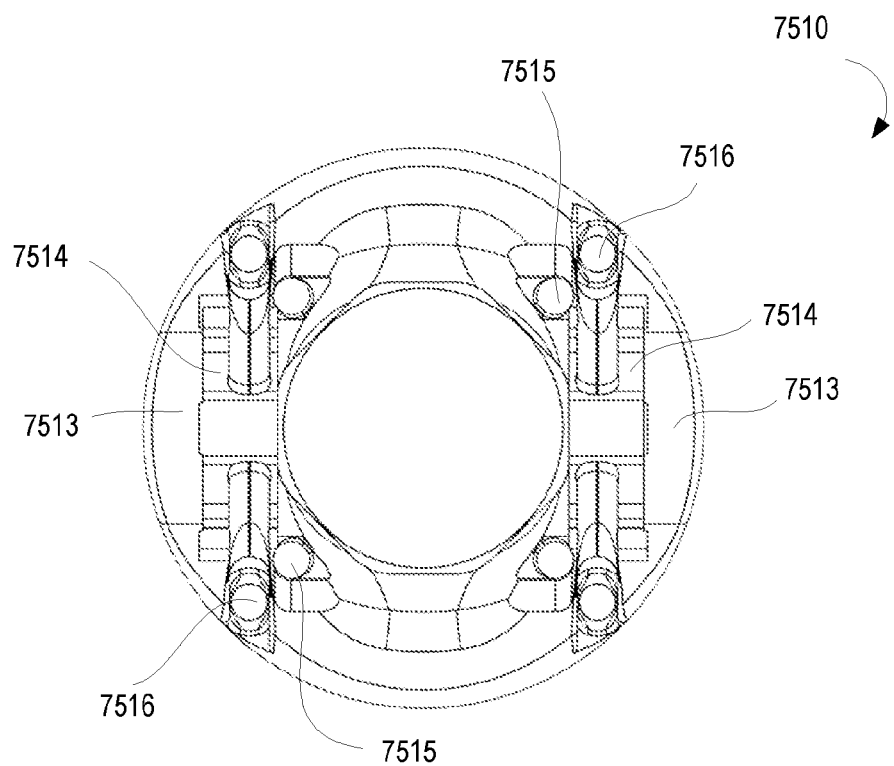

The wrist assembly 7500 and its components are shown in FIGS. 25-34. The wrist assembly 7500 includes five links that are rotatably coupled together and that couple the end effector 7460 to the distal end portion 7412 of the shaft 7410. As described herein, the links of the wrist assembly 7500 rotate relative to each other (and the shaft 7410) about multiple axes of rotation to produce the desired degrees of freedom. Specifically, the wrist assembly 7500 is configured to produce retroflex motion (see FIG. 27). The wrist assembly 7500 includes a first link 7510, a second link 7520, a third link 7530, a fourth link 7540, and a fifth link 7550. Each of the links has a proximal end portion and a distal end portion. The proximal end portion of the first link 7510 is coupled to the shaft 7410. As shown in FIG. 25, the distal end portion of the first link 7510 is rotatably coupled to the proximal end portion of the second link 7520 such that the second link 7520 and the first link 7510 can rotate relative to each other about a first pitch axis $A_{P1}$ (the term pitch is arbitrary). More specifically, as shown in FIGS. 29 and 30, the first link 7510 includes two rolling surfaces 7513 and two sets of teeth 7514. The rolling surfaces 7513 are engaged with the corresponding proximal rolling surfaces 7523 (see FIG. 32) of the second link 7520 and the two sets of teeth 7514 are meshed with the corresponding sets of teeth 7524 of the second link 7520. Any of the sets of teeth and rolling surfaces described herein can be similar to those shown and described in U.S. Patent Application Pub. No. US 2017/0120457 A1 (filed Feb. 20, 2015), entitled "Mechanical Wrist Joints with Enhanced Range of Motion, and Related Devices and Methods," which is incorporated herein by reference in its entirety. Because the joint between the first link 7510 and the second link 7520 is not a pinned joint, the first pitch axis $A_{P1}$ will move relative to the first link 7510 during rotation of the second link 7520.

Figure 31:
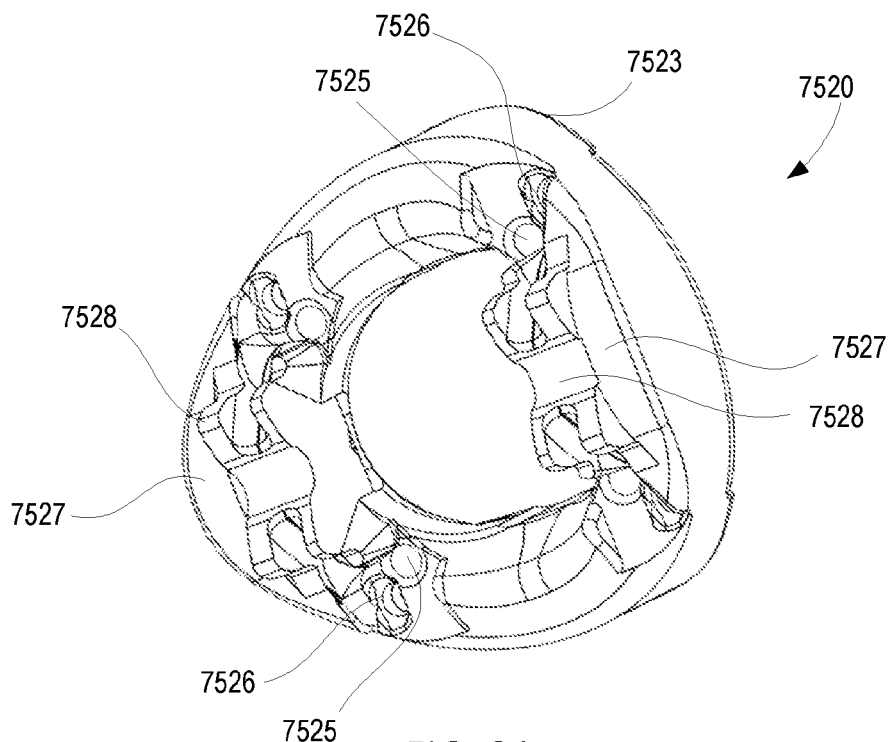
FIGS. 31-32 are perspective views of the second link of the wrist assembly shown in FIGS. 25-27.
Figure 32:
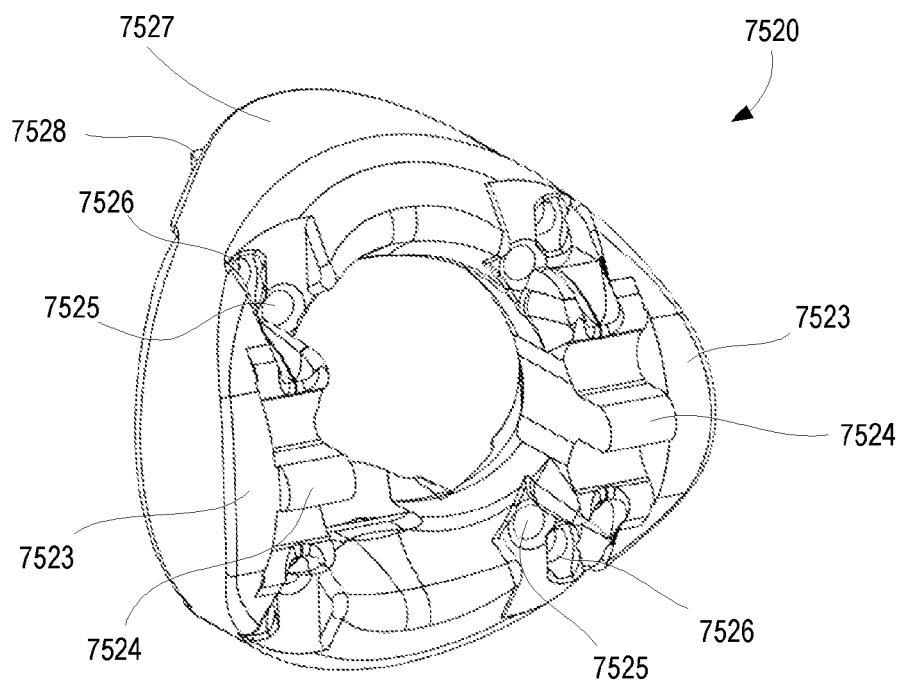
Figure 33:
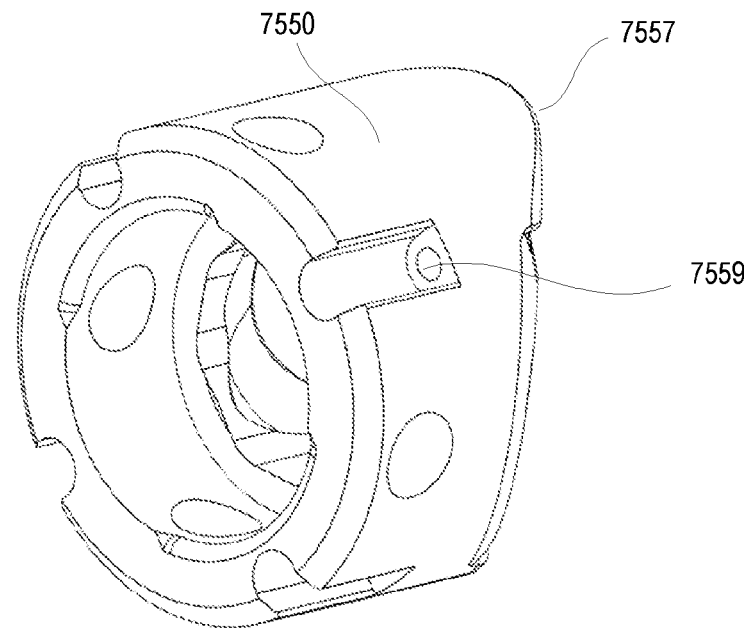
FIGS. 33-34 are perspective views of the fifth link of the wrist assembly shown in FIGS. 25-27.

As shown in FIG. 26, the distal end portion of the second link 7520 is rotatably coupled to the proximal end portion of the third link 7530 such that the third link 7530 and the second link 7520 can rotate relative to each other about a first yaw axis $A_{Y1}$ (the term yaw is arbitrary) that is normal to the first pitch axis $A_{P1}$. As shown in FIG. 31, the distal end portion of the second link 7510 includes two distal rolling surfaces 7527 and two sets of teeth 7528. The distal rolling surfaces 7527 are engaged with the corresponding proximal rolling surfaces 7533 (see FIG. 28) of the third link 7530 and the two sets of teeth 7528 are meshed with the corresponding sets of teeth (not identified) of the third link 7530. Because the joint between the second link 7520 and the third link 7530 is not a pinned joint, the first yaw axis $A_{Y1}$ will move relative to the second link 7520 during rotation of the third link 7530.

Figure 34:
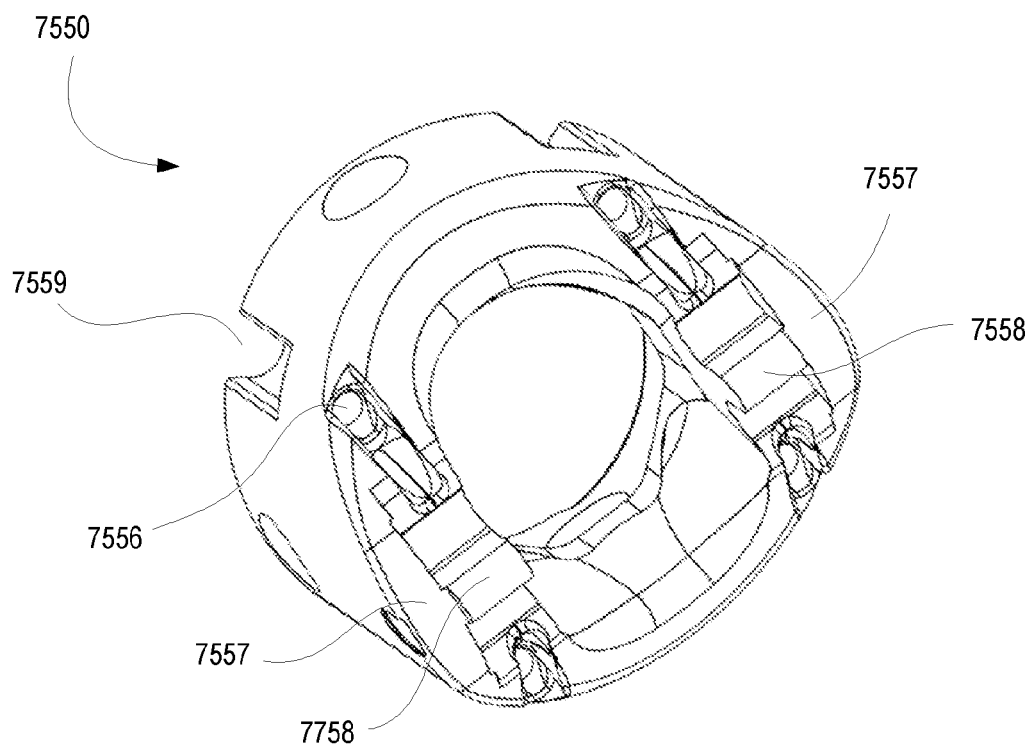

In a similar manner, the distal end portion of the third link 7530 is rotatably coupled to the proximal end portion of the fourth link 7540 such that the fourth link 7540 and the third link 7530 can rotate relative to each other about a second pitch axis $A_{P2}$. The structure of the third link 7530 and the fourth link 7540 is substantially similar to the structure of the second link 7520 (shown in FIGS. 31 and 32), so the details of the third link 7530 and the fourth link 7540 are not separately described herein. Referring to FIG. 28, the third link 7510 includes two rolling surfaces 7537 and two sets of teeth 7538 (which are similar to the rolling surfaces 7527 and the teeth 7528 of the second link 7520). The rolling surfaces 7537 are engaged with the corresponding proximal rolling surfaces of the fourth link 7540 and the two sets of teeth 7538 are meshed with the corresponding sets of teeth of the fourth link 7540. Because the joint between the third link 7530 and the fourth link 7540 is not a pinned joint, the second pitch axis $A_{P2}$ will move relative to the third link 7530 during rotation of the fourth link 7540. In a similar manner, the distal end portion of the fourth link 7540 is rotatably coupled to the proximal end portion of the fifth link 7550 such that the fifth link 7550 and the fourth link 7540 can rotate relative to each other about a second yaw axis $A_{Y2}$. Referring to FIG. 34, the fifth link includes two rolling surfaces 7557 and two sets of teeth 7558 (which are similar to the rolling surfaces 7523 and the teeth 7524 of the second link 7520).

As shown, the links of the wrist assembly 7500 includes multiple pairs of links that rotate relative to each other about alternating normal axes. Specifically, the links of the wrist assembly 7500 rotate about the first the first pitch axis $A_{P1}$, the first yaw axis $A_{Y1}$, the second pitch axis $A_{P2}$, and the second yaw axis $A_{Y2}$. Thus, the wrist assembly 7500 is said to have a "pitch-yaw-pitch-yaw" configuration. In other embodiments, however, the wrist assembly 7500 (or any of the wrist assemblies described herein) can be configured to have a "pitch-yaw-yaw-pitch" configuration or a "yaw-pitch-pitch-yaw" configuration.

The cables are routed through and coupled to the links of the wrist assembly 7500 by a series of cable openings, which function as guide bores. As shown in FIG. 30, the first link includes four inner cable openings 7515 and four outer openings 7516. Similarly, the second link 7520 includes four inner cable openings 7525 and four outer openings 7526. The four cables that terminate in the third link 7530 (i.e., the four shorter cables) are routed through the four inner cable openings 7515, 7525. Specifically, as shown in FIG. 28, the distal end portion 7422 of the first cable 7420 and the distal end portion 7432 of the second cable 7430 are routed through the inner cable openings 7515, 7525. The four cables that terminate in the fifth link 7550 (i.e., the four longer cables) are routed through the four outer cable openings 7516, 7526. Specifically, as shown in FIG. 28, the distal end portion 7442 of the third cable 7440 and the distal end portion 7452 of the fourth cable 7450 are routed through the outer cable openings 7516, 7526. The fifth link 7550 includes only four outer cable openings 7556 (through which the longer third cable 7440 and fourth cable 7450 are routed). The fifth link 7550 also includes four termination openings 7559 that are used to fixedly couple the ends of the four longer cables (including the third cable 7440 and the fourth cable 7450) to the fifth link 7550.

Referring to FIG. 28, the distal end portion 7422 of the first cable 7420 is coupled to and terminates in the third link 7530. The first cable 7420 is routed through the wrist assembly 7500 via the inner cable openings 7515, 7525 and into the shaft 7410. As described above, the proximal end portion 7421 of the first cable 7420 is routed within the mechanical structure 7700 (e.g., via the pulley 7791) and is wrapped about (and coupled to) the first cable drum 7711. The distal end portion 7432 of the second cable 7430 is coupled to and terminates in the third link 7530. The second cable 7430 is routed through the wrist assembly 7500 via the inner cable openings 7515, 7525 and into the shaft 7410. The proximal end portion 7431 of the second cable 7430 is routed within the mechanical structure 7700 (e.g., via the pulley 7792) and is wrapped about (and coupled to) the second cable drum 7712. Thus, the first cable 7420 and the second cable 7430 (and the corresponding short cables coupled to the first and second cable drums of the second capstan assembly 7720) cause rotation of the first link 7710, the second link 7720, and the third link 7730 about the first pitch axis $A_{P1}$ and the first yaw axis $A_{Y1}$. Although the distal end 7422 of the first cable 7420 is shown as being coupled together with a distal end of another cable (e.g., a cable having a proximal end coupled to the second capstan assembly 7720) in other embodiments, the distal end 7422 of the first cable 7420 can have a separate termination portion (e.g., a crimp). Similarly, although the distal end 7432 of the second cable 7430 is shown as being coupled together with a distal end of another cable (e.g., a cable having a proximal end coupled to the second capstan assembly 7720) in other embodiments, the distal end 7432 of the second cable 7430 can have a separate termination portion (e.g., a crimp). Moreover, in other embodiments, the distal end 7422 of the first cable 7420 and the distal end 7432 of the second cable 7430 can be coupled together (i.e., the first cable 7420 and the second cable 7430 can be two portions of a cable loop).

The distal end portion 7442 of the third cable 7440 is coupled to and terminates in the fifth link 7550. The third cable 7440 is routed through the wrist assembly 7500 via the outer cable openings 7516, 7526 and into the shaft 7410. The proximal end portion 7441 of the third cable 7440 is routed within the mechanical structure 7700 (e.g., via the pulley 7781) and is wrapped about (and coupled to) the third cable drum 7711. The distal end portion 7452 of the fourth cable 7450 is coupled to and terminates in the fifth link 7550. The fourth cable 7450 is routed through the wrist assembly 7500 via the outer cable openings 7516, 7526 and into the shaft 7410. The proximal end portion 7451 of the fourth cable 7450 is routed within the mechanical structure 7700 (e.g., via the pulley 7782) and is wrapped about (and coupled to) the fourth cable drum 7714. Thus, the third cable 7440 and the fourth cable 7450 (and the corresponding long cables coupled to the third and fourth cable drums of the second capstan assembly 7720) cause rotation of the all of the links about all four axes of the wrist assembly 7500. the first pitch axis $A_{P1}$ and the first yaw axis $A_{Y1}$. As such, the cable path of the third cable 7440 and the fourth cable 7450 is longer than that of the first cable 7420 and the second cable 7430. Accordingly, when the wrist assembly 7500 is moved from a first (or straight) configuration (FIGS. 25 and 26) to a second (or bent) configuration (FIG. 27), the third cable 7440 and the fourth cable 7450 will be moved a greater distance and at a greater speed than the first cable 7420 and the second cable 7430.

With the first cable 7420, the second cable 7430, the third cable 7440, and the fourth cable 7450 each coupled to the wrist assembly 7500 and the first capstan assembly 7710 as described above, rotational movement of the first capstan assembly 7710 about the first capstan axis $A_1$ causes the first cable 7420 and the second cable 7430 to move at a first speed (and through a first distance) and the third cable 7440 and the fourth cable 7450 to move at a second speed (and through a second distance) thereby operating the wrist 2500. In this manner, the wrist assembly 7500 can be moved between its first (or straight) configuration (FIG. 26), its second (or bent) configuration (FIG. 27), and configurations involving rotation about any of the axes of the wrist assembly 7500. The arrangement of the first capstan assembly 7710 and the second capstan assembly 7720 can advantageously allow for a single capstan assembly to produce different amounts of cable movement or cable speed. Different cable motion characteristics can improve the operation of the wrist assembly 7500. The first capstan assembly 7710 (and the other capstan assemblies described herein) can produce the desired different amounts of movement (or cable speed) with a single input, thereby preserving space in the mechanical structure 7700.

While various embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made.

For example, any of the instruments described herein (and the components therein) are optionally parts of a surgical assembly that performs minimally invasive surgical procedures, and which can include a manipulator unit, a series of kinematic linkages, a series of cannulas, or the like. Thus, any of the instruments described herein can be used in any suitable surgical system, such as the MIRS system 1000 shown and described above. Moreover, any of the instruments shown and described herein can be used to manipulate target tissue during a surgical procedure. Such target tissue can be cancer cells, tumor cells, lesions, vascular occlusions, thrombosis, calculi, uterine fibroids, bone metastases, adenomyosis, or any other bodily tissue. The presented examples of target tissue are not an exhaustive list. Moreover, a target structure can also include an artificial substance (or non-tissue) within or associated with a body, such as for example, a stent, a portion of an artificial tube, a fastener within the body or the like.

For example, any of the wrists or tool members can be constructed from any material, such as medical grade stainless steel, nickel alloys, titanium alloys or the like. Further, any of the links, tool members, tension members, or components described herein can be constructed from multiple pieces that are later joined together. For example, in some embodiments, a link can be constructed by joining together separately constructed components. In other embodiments however, any of the links, tool members, tension members, or components described herein can be monolithically constructed.

Any of the cables described herein can be formed from any suitable materials. For example, in some embodiments, any of the cables described herein can be formed from tungsten strands. In other embodiments, any of the cables described herein can be formed from an ultra-high molecular weight polyethylene (UHMWPE) fiber. In some embodiments, any of the cables described herein can be constructed from a single strand or fiber. In other embodiments, any of the cables described herein can be constructed from multiple fibers woven or otherwise joined together to form the cable. In some embodiments, any of the cables described herein can include a coating or other surface treatment to enhance the frictional characteristics of the cable. Such enhanced frictional characteristics can help facilitate having the cable wrapped about the capstan assemblies or cable drums described herein.

Although the cables of the instrument 7400 (e.g., the first cable 7420) are shown and described as being coupled to their respective cable drum (e.g., the first cable drum 7711) by a crimp secured within a connection opening (e.g., the first connection opening 7755), in other embodiments any of the cables described herein can be coupled to a capstan by any suitable mechanism, e.g., by wrapping the cable about the cable drum in a manner that prevents slip or by an adhesive.

Although the medical instruments are described herein as include one or more cables, in other embodiments, any of the medical instruments described herein can include any suitable tension member for operating a wrist or end effector. For example, any of the medical instruments described herein can include tension bands (instead of or in addition to cables), of the types shown and described in International Patent Appl. No. PCT/US2018/064721 (filed Dec. 10, 2018), entitled "Medical Tools Having Tension Bands," which is incorporated herein by reference in its entirety.

Although various embodiments have been described as having particular features and/or combinations of components, other embodiments are possible having a combination of any features and/or components from any of embodiments as discussed above. Aspects have been described in the general context of medical devices, and more specifically surgical instruments, but inventive aspects are not necessarily limited to use in medical devices.

What is claimed is:

1. A medical instrument, comprising:
an instrument shaft comprising a distal end portion and a proximal end portion;
a wrist coupled to the distal end portion of the instrument shaft, the wrist including a first link rotatable relative to the instrument shaft about a first axis and a second link rotatable relative to the instrument shaft about a second axis;
a mechanical structure coupled to the proximal end portion of the instrument shaft, the mechanical structure including a capstan assembly that includes a first cable drum defining a first radius and a second cable drum defining a second radius different than the first radius, the first cable drum and the second cable drum being rotatable about a common capstan axis,
a first cable of a first cable pair, the first cable including a proximal end portion and a distal end portion, the first cable being routed along the instrument shaft, the distal end portion of the first cable being coupled to the first link, and the proximal end portion of the first cable being wrapped about the first cable drum in a first wrap direction; and
a second cable of the first cable pair, the second cable including a proximal end portion and a distal end portion, the second cable being routed along the instrument shaft, the distal end portion of the second cable being coupled to the second link, and the proximal end portion of the second cable being wrapped about the second cable drum in the same first wrap direction as the proximal end portion of the first cable, wherein:
a rotation of the capstan assembly about the common capstan axis moves the distal end portion of the first cable in a first direction and along a first distance that is defined in part by the first radius,
the same rotation of the capstan assembly about the common capstan axis moves the distal end portion of the second cable in the first direction and along a second distance that is defined in part by the second radius,
the movement of the distal end portion of the first cable causes the first link to rotate in a first link direction relative to the instrument shaft, the movement of the distal end portion of the second cable causes the second link to rotate in the first link direction relative to the instrument shaft, and a difference between a magnitude of the rotation of the first link and a magnitude of the rotation of the second link in the same direction is defined by a proportion between the first radius and the second radius.

2. The medical instrument of claim 1, wherein:

the capstan assembly comprises an input disc;

the input disc is configured to be driven by an actuator to rotate the capstan assembly about the common capstan axis; and rotation of the capstan assembly about the common capstan axis moves the first cable at a first speed proportional to the first radius and the second cable at a second speed proportional to the second radius.

3. The medical instrument of claim 2, wherein:

the first cable drum comprises a first center line; and the second cable drum comprises a second center line that is nonconcentric to the first center line.

4. The medical instrument of claim 1, wherein:

the movement of the distal end portion of the first cable and of the distal end portion of the second cable actuates the wrist.

5. The medical instrument of claim 1, further comprising:

a second cable pair including a third cable and a fourth cable, wherein:

the third cable includes a proximal end portion and a distal end portion and is routed along the instrument shaft, the distal end portion of the third cable is coupled to the wrist, and the proximal end portion of the third cable is wrapped about the first cable drum in a second wrap direction opposite the first wrap direction; and the fourth cable includes a proximal end portion and a distal end portion and is routed along the instrument shaft, the distal end portion of the fourth cable is coupled to the wrist, and the proximal end portion of the fourth cable is wrapped about the second cable drum in the second wrap direction as the proximal end portion of the third cable.

6. The medical instrument of claim 5, wherein:

the capstan assembly comprises an input disc;

the input disc is configured to be driven by an actuator to rotate the capstan assembly about the common capstan axis;

rotation of the capstan assembly about the common capstan axis moves the first cable and the third cable at a first speed proportional to the first radius; and rotation of the capstan assembly about the common capstan axis moves the second cable and the fourth cable at a second speed proportional to the second radius.

7. The medical instrument of claim 5, wherein:

the capstan assembly comprises an input disc;

the input disc is configured to be driven by an actuator to rotate the capstan assembly about the common capstan axis;

rotation of the capstan assembly about the common capstan axis moves the first cable pair in a first direction along the instrument shaft to actuate the wrist; and rotation of the capstan assembly about the common capstan axis moves the second cable pair a second direction along the instrument shaft to actuate the wrist, the second direction opposite the first direction.

8. The medical instrument of claim 1, wherein:

the capstan assembly comprises a capstan shaft, a first clamp, a second clamp, and an input disc;

the input disc is coupled to the capstan shaft such that rotation of the input disc causes rotation of the capstan shaft;

the first cable drum includes a first wrap member and a second wrap member;

the first wrap member is coupled to the capstan shaft by the first clamp;

the second wrap member is coupled to the capstan shaft by the second clamp;

the proximal end portion of the first cable is wrapped about the first wrap member in the first wrap direction; and the proximal end portion of a third cable is wrapped about the second wrap member in a second wrap direction opposite the first direction.

9. The medical instrument of claim 1, wherein:

the first link is positioned between the instrument shaft and the second link.

10. The medical instrument of claim 9, wherein:

the wrist comprises one or more intermediate links;

the first link is coupled to the second link by the one or more intermediate links; and the first axis is parallel to the second axis.

11. A medical instrument, comprising:

a distal first movable component, a distal second movable component, a proximal rotatable capstan, a first drive member coupled to the capstan, and a second drive member coupled to the capstan, and a tension member pair including a first tension member and a second tension member, wherein:

the first drive member includes a first wrap region, and the second drive member includes a second wrap region, the first tension member extends from the first movable component to wrap at least partially around the first drive member in a first wrap direction at the first wrap region, the second tension member extends from the second movable component to wrap at least partially around the second drive member in the first wrap direction at the second wrap region, the first drive member and the second drive member are rotatable about a common capstan axis, the first drive member has a first radius of rotation at a location where the first tension member wraps on and off the first wrap region, the second drive member has a second radius of rotation at a location where the second tension member wraps on and off the second wrap region, the second radius of rotation is different from the first radius of rotation, a rotation of the proximal rotatable capstan about the common capstan axis moves a distal end portion of the first tension member in a first direction and along a first distance that is defined in part by the first radius, the same rotation of the proximal rotatable capstan about the common capstan axis moves a distal end portion of the second tension member in the first direction and along a second distance that is defined in part by the second radius, the movement of the distal end portion of the first tension member causes the first distal movable component to rotate in a first distal component direction, the movement of the distal end portion of the second tension member causes the second distal movable component to rotate in the first distal component direction, and a difference between a magnitude of the rotation of the first distal movable component and a magnitude of the rotation of the second distal movable component in the same direction is defined by a proportion between the first radius and the second radius.

12. The medical instrument of claim 11, wherein:
the first radius of rotation is constant as the first drive member rotates with the capstan; and
the second radius of rotation is non-constant as the second drive member rotates with the capstan.

13. The medical instrument of claim 11, wherein:
the second radius of rotation is between 1.5 and 2.5 times as large as the first radius of rotation.

14. The medical instrument of claim 11, further comprising:
a rotatable drive disc coupled to the capstan; and
wherein the drive disc is configured to receive a motor drive input to rotate the capstan.

15. The medical instrument of claim 11, wherein:
a longitudinal orientation is defined for the medical instrument, and a longitudinal orientation is defined for the second movable component;
the second movable component is distal of the first movable component; and
rotation of the capstan moves the second movable component from a first state in which the longitudinal orientation of the second movable component is aligned with the longitudinal orientation of the medical instrument to a second state in which the longitudinal orientation of the second movable component is retroflexed with reference to the longitudinal orientation of the medical instrument.

16. The medical instrument of claim 11, further comprising:
a distal wrist and a distal end effector coupled to the wrist;
the wrist comprises the distal first movable component and the distal second movable component;
a longitudinal orientation is defined for the medical instrument, and a longitudinal orientation is defined for the end effector; and
rotation of the capstan moves the end effector from a first state in which the longitudinal orientation of the end effector is aligned with the longitudinal orientation of the medical instrument to a second state in which the longitudinal orientation of the end effector is retroflexed with reference to the longitudinal orientation of the medical instrument.

17. The medical instrument of claim 1, wherein:
the first cable of the first cable pair has a first cable path;
the second cable of the first cable pair has a second cable path;
a length of the second cable path is greater than a length of the first cable path; and
on a condition in which the wrist is moved from a first configuration to a second configuration having a larger bend than the first configuration, the second link bends to a greater degree than the first link in the same direction.

18. The medical instrument of claim 1, wherein:
the first radius of the capstan assembly is less than the second radius of the capstan assembly; and
the magnitude of the rotation of the first link is less than the magnitude of the rotation of the second link.

* * * * *